(12) United States Patent
Caudy et al.

(10) Patent No.: US 10,003,673 B2
(45) Date of Patent: *Jun. 19, 2018

(54) COMPUTER DATA DISTRIBUTION ARCHITECTURE

(71) Applicant: Walleye Software, LLC, Plymouth, MN (US)

(72) Inventors: Ryan Caudy, New York, NY (US); David R. Kent, IV, Colorado Springs, CO (US); Charles Wright, Cortlandt Manor, NY (US); Radu Teodorescu, New York, NY (US)

(73) Assignee: Illumon LLC, Plymouth, MN (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/464,314

(22) Filed: Mar. 20, 2017

(65) Prior Publication Data

US 2017/0195461 A1 Jul. 6, 2017

Related U.S. Application Data

(63) Continuation of application No. 15/155,001, filed on May 14, 2016, now Pat. No. 9,633,060.

(60) Provisional application No. 62/161,813, filed on May 14, 2015.

(51) Int. Cl.
| | | |
|---|---|---|
| *G06F 15/167* | (2006.01) | |
| *H04L 29/06* | (2006.01) | |
| *H04L 29/08* | (2006.01) | |
| *G06F 12/084* | (2016.01) | |
| *G06F 17/30* | (2006.01) | |

(52) U.S. Cl.
CPC ............ *H04L 67/42* (2013.01); *G06F 12/084* (2013.01); *G06F 17/30315* (2013.01); *G06F 17/30339* (2013.01); *G06F 17/30902* (2013.01); *H04L 67/28* (2013.01); *H04L 67/2833* (2013.01); *H04L 67/2842* (2013.01); *H04L 67/34* (2013.01); *G06F 2212/154* (2013.01); *G06F 2212/163* (2013.01); *H04L 67/2847* (2013.01)

(58) Field of Classification Search
CPC . H04L 67/28; H04L 67/2833; H04L 67/2842; G06F 17/30902
USPC ................................. 709/201–203, 212–219
See application file for complete search history.

(56) References Cited

U.S. PATENT DOCUMENTS

| | | |
|---|---|---|
| 5,335,202 A | 8/1994 | Manning et al. |
| 5,452,434 A | 9/1995 | Macdonald |
| 5,469,567 A | 11/1995 | Okada |

(Continued)

FOREIGN PATENT DOCUMENTS

| | | |
|---|---|---|
| CA | 2309462 A1 | 12/2000 |
| EP | 1406463 A2 | 4/2004 |

(Continued)

OTHER PUBLICATIONS

"About Entering Commands in the Command Window", dated Dec. 16, 2015. Retrieved from https://knowledge.autodesk.com/support/autocad/learn-explore/caas/CloudHelp/cloudhelp/2016/ENU/AutoCAD-Core/files/GUID-BB0C3E79-66AF-4557-9140-D31B4CF3C9CF-htm.html (last accessed Jun. 16, 2016).

(Continued)

*Primary Examiner* — Bharat N Barot
(74) *Attorney, Agent, or Firm* — Carmichael IP, PLLC

(57) ABSTRACT

Described are methods, systems and computer readable media for computer data distribution architecture.

35 Claims, 12 Drawing Sheets

(56) References Cited

U.S. PATENT DOCUMENTS

| | | |
|---|---|---|
| 5,504,885 A | 4/1996 | Alashqur |
| 5,530,939 A | 6/1996 | Mansfield et al. |
| 5,568,632 A | 10/1996 | Nelson |
| 5,673,369 A | 9/1997 | Kim |
| 5,701,461 A | 12/1997 | Dalal et al. |
| 5,701,467 A | 12/1997 | Freeston |
| 5,764,953 A | 6/1998 | Collins et al. |
| 5,787,428 A | 7/1998 | Hart |
| 5,806,059 A | 9/1998 | Tsuchida et al. |
| 5,859,972 A | 1/1999 | Subramaniam et al. |
| 5,875,334 A | 2/1999 | Chow et al. |
| 5,878,415 A | 3/1999 | Olds |
| 5,890,167 A | 3/1999 | Bridge et al. |
| 5,899,990 A | 5/1999 | Maritzen et al. |
| 5,920,860 A | 7/1999 | Maheshwari et al. |
| 5,943,672 A | 8/1999 | Yoshida |
| 5,960,087 A | 9/1999 | Tribble et al. |
| 5,991,810 A | 11/1999 | Shapiro et al. |
| 5,999,918 A | 12/1999 | Williams et al. |
| 6,006,220 A | 12/1999 | Haderle et al. |
| 6,032,144 A | 2/2000 | Srivastava et al. |
| 6,032,148 A | 2/2000 | Wilkes |
| 6,038,563 A | 3/2000 | Bapat et al. |
| 6,058,394 A | 5/2000 | Bakow et al. |
| 6,061,684 A | 5/2000 | Glasser et al. |
| 6,138,112 A | 10/2000 | Slutz |
| 6,266,669 B1 | 7/2001 | Brodersen et al. |
| 6,289,357 B1 | 9/2001 | Parker |
| 6,292,803 B1 | 9/2001 | Richardson et al. |
| 6,304,876 B1 | 10/2001 | Isip |
| 6,317,728 B1 | 11/2001 | Kane |
| 6,327,702 B1 | 12/2001 | Sauntry et al. |
| 6,336,114 B1 | 1/2002 | Garrison |
| 6,353,819 B1 | 3/2002 | Edwards et al. |
| 6,367,068 B1 | 4/2002 | Vaidyanathan et al. |
| 6,389,414 B1 | 5/2002 | Delo et al. |
| 6,389,462 B1 | 5/2002 | Cohen et al. |
| 6,438,537 B1 | 8/2002 | Netz et al. |
| 6,446,069 B1 | 9/2002 | Yaung et al. |
| 6,460,037 B1 | 10/2002 | Weiss et al. |
| 6,473,750 B1 | 10/2002 | Petculescu et al. |
| 6,487,552 B1 | 11/2002 | Lei et al. |
| 6,496,833 B1 | 12/2002 | Goldberg et al. |
| 6,505,189 B1 | 1/2003 | Au et al. |
| 6,505,241 B2 * | 1/2003 | Pitts .................... G06F 12/0813 709/203 |
| 6,510,551 B1 | 1/2003 | Miller |
| 6,530,075 B1 | 3/2003 | Beadle et al. |
| 6,538,651 B1 | 3/2003 | Hayman et al. |
| 6,546,402 B1 | 4/2003 | Beyer et al. |
| 6,553,375 B1 | 4/2003 | Huang et al. |
| 6,584,474 B1 | 6/2003 | Pereira |
| 6,604,104 B1 | 8/2003 | Smith |
| 6,618,720 B1 | 9/2003 | Au et al. |
| 6,631,374 B1 | 10/2003 | Klein et al. |
| 6,640,234 B1 | 10/2003 | Coffen et al. |
| 6,697,880 B1 | 2/2004 | Dougherty |
| 6,701,415 B1 | 3/2004 | Hendren |
| 6,714,962 B1 | 3/2004 | Helland et al. |
| 6,725,243 B2 | 4/2004 | Snapp |
| 6,732,100 B1 | 5/2004 | Brodersen et al. |
| 6,745,332 B1 | 6/2004 | Wong et al. |
| 6,748,374 B1 | 6/2004 | Madan et al. |
| 6,748,455 B1 | 6/2004 | Hinson et al. |
| 6,760,719 B1 | 7/2004 | Hanson et al. |
| 6,775,660 B2 | 8/2004 | Lin et al. |
| 6,785,668 B1 | 8/2004 | Polo et al. |
| 6,795,851 B1 | 9/2004 | Noy |
| 6,816,855 B2 | 11/2004 | Hartel et al. |
| 6,820,082 B1 | 11/2004 | Cook et al. |
| 6,829,620 B2 | 12/2004 | Michael et al. |
| 6,832,229 B2 | 12/2004 | Reed |
| 6,851,088 B1 | 2/2005 | Conner et al. |
| 6,882,994 B2 | 4/2005 | Yoshimura et al. |
| 6,925,472 B2 | 8/2005 | Kong |
| 6,934,717 B1 | 8/2005 | James |
| 6,947,928 B2 | 9/2005 | Dettinger et al. |
| 6,983,291 B1 | 1/2006 | Cochrane et al. |
| 6,985,895 B2 | 1/2006 | Witkowski et al. |
| 6,985,899 B2 | 1/2006 | Chan et al. |
| 6,985,904 B1 | 1/2006 | Kaluskar et al. |
| 7,020,649 B2 | 3/2006 | Cochrane et al. |
| 7,024,414 B2 | 4/2006 | Sah et al. |
| 7,031,962 B2 | 4/2006 | Moses |
| 7,058,657 B1 | 6/2006 | Berno |
| 7,089,228 B2 | 8/2006 | Arnold et al. |
| 7,089,245 B1 | 8/2006 | George et al. |
| 7,096,216 B2 | 8/2006 | Anonsen |
| 7,099,927 B2 * | 8/2006 | Cudd ................. G06F 17/30902 709/219 |
| 7,103,608 B1 | 9/2006 | Ozbutun et al. |
| 7,110,997 B1 | 9/2006 | Turkel et al. |
| 7,127,462 B2 | 10/2006 | Hiraga et al. |
| 7,146,357 B2 | 12/2006 | Suzuki et al. |
| 7,149,742 B1 | 12/2006 | Eastham et al. |
| 7,167,870 B2 | 1/2007 | Avvari et al. |
| 7,171,469 B2 | 1/2007 | Ackaouy et al. |
| 7,174,341 B2 | 2/2007 | Ghukasyan et al. |
| 7,181,686 B1 | 2/2007 | Bahrs |
| 7,188,105 B2 | 3/2007 | Dettinger et al. |
| 7,200,620 B2 | 4/2007 | Gupta |
| 7,216,115 B1 | 5/2007 | Walters et al. |
| 7,216,116 B1 | 5/2007 | Nilsson et al. |
| 7,219,302 B1 | 5/2007 | O'Shaughnessy et al. |
| 7,225,189 B1 | 5/2007 | McCormack et al. |
| 7,254,808 B2 | 8/2007 | Trappen et al. |
| 7,257,689 B1 | 8/2007 | Baird |
| 7,272,605 B1 | 9/2007 | Hinshaw et al. |
| 7,308,580 B2 | 12/2007 | Nelson et al. |
| 7,316,003 B1 | 1/2008 | Dulepet et al. |
| 7,330,969 B2 | 2/2008 | Harrison et al. |
| 7,333,941 B1 | 2/2008 | Choi |
| 7,343,585 B1 | 3/2008 | Lau et al. |
| 7,350,237 B2 | 3/2008 | Vogel et al. |
| 7,380,242 B2 | 5/2008 | Alaluf |
| 7,401,088 B2 | 7/2008 | Chintakayala et al. |
| 7,426,521 B2 | 9/2008 | Harter |
| 7,430,549 B2 | 9/2008 | Zane et al. |
| 7,433,863 B2 | 10/2008 | Zane et al. |
| 7,447,865 B2 | 11/2008 | Uppala et al. |
| 7,478,094 B2 | 1/2009 | Ho et al. |
| 7,484,096 B1 | 1/2009 | Garg et al. |
| 7,493,311 B1 | 2/2009 | Cutsinger et al. |
| 7,506,055 B2 * | 3/2009 | McClain ........... G06F 17/30902 709/229 |
| 7,529,734 B2 | 5/2009 | Dirisala |
| 7,529,750 B2 | 5/2009 | Bair |
| 7,542,958 B1 | 6/2009 | Warren et al. |
| 7,552,223 B1 * | 6/2009 | Ackaouy ........... G06F 17/30067 709/213 |
| 7,610,351 B1 | 10/2009 | Gollapudi et al. |
| 7,620,687 B2 | 11/2009 | Chen et al. |
| 7,624,126 B2 | 11/2009 | Pizzo et al. |
| 7,627,603 B2 | 12/2009 | Rosenblum et al. |
| 7,661,141 B2 | 2/2010 | Dutta et al. |
| 7,664,778 B2 | 2/2010 | Yagoub et al. |
| 7,672,275 B2 | 3/2010 | Yajnik et al. |
| 7,680,782 B2 | 3/2010 | Chen et al. |
| 7,711,716 B2 | 5/2010 | Stonecipher |
| 7,711,740 B2 | 5/2010 | Minore et al. |
| 7,761,444 B2 | 7/2010 | Zhang et al. |
| 7,797,356 B2 | 9/2010 | Iyer et al. |
| 7,827,204 B2 | 11/2010 | Heinzel et al. |
| 7,827,403 B2 | 11/2010 | Wong et al. |
| 7,827,523 B2 | 11/2010 | Ahmed et al. |
| 7,882,121 B2 | 2/2011 | Bruno et al. |
| 7,882,132 B2 | 2/2011 | Ghatare |
| 7,904,487 B2 | 3/2011 | Ghatare |
| 7,908,259 B2 | 3/2011 | Branscome et al. |
| 7,908,266 B2 | 3/2011 | Zeringue et al. |
| 7,930,412 B2 | 4/2011 | Yeap et al. |
| 7,966,311 B2 | 6/2011 | Haase |
| 7,966,312 B2 | 6/2011 | Nolan et al. |
| 7,966,343 B2 | 6/2011 | Yang et al. |

(56) References Cited

U.S. PATENT DOCUMENTS

| | | |
|---|---|---|
| 7,970,777 B2 | 6/2011 | Saxena et al. |
| 7,979,431 B2 | 7/2011 | Qazi et al. |
| 7,984,043 B1 | 7/2011 | Waas |
| 8,019,795 B2 | 9/2011 | Anderson et al. |
| 8,027,293 B2 | 9/2011 | Spaur et al. |
| 8,032,525 B2 | 10/2011 | Bowers et al. |
| 8,037,542 B2 | 10/2011 | Taylor et al. |
| 8,046,394 B1 | 10/2011 | Shatdal |
| 8,046,749 B1 | 10/2011 | Owen et al. |
| 8,055,672 B2 | 11/2011 | Djugash et al. |
| 8,060,484 B2 | 11/2011 | Bandera et al. |
| 8,171,018 B2 | 5/2012 | Zane et al. |
| 8,180,789 B1 | 5/2012 | Wasserman et al. |
| 8,196,121 B2 | 6/2012 | Peshansky et al. |
| 8,209,356 B1 | 6/2012 | Roesler |
| 8,286,189 B2 | 10/2012 | Kukreja et al. |
| 8,321,833 B2 | 11/2012 | Langworthy et al. |
| 8,332,435 B2 | 12/2012 | Ballard et al. |
| 8,359,305 B1 | 1/2013 | Burke et al. |
| 8,375,127 B1 | 2/2013 | Lita |
| 8,380,757 B1 | 2/2013 | Bailey et al. |
| 8,418,142 B2 | 4/2013 | Ao et al. |
| 8,433,701 B2 | 4/2013 | Sargeant et al. |
| 8,458,218 B2 | 6/2013 | Wildermuth |
| 8,473,897 B2 | 6/2013 | Box et al. |
| 8,478,713 B2 | 7/2013 | Cotner et al. |
| 8,515,942 B2 | 8/2013 | Marum et al. |
| 8,543,620 B2 | 9/2013 | Ching |
| 8,553,028 B1 | 10/2013 | Urbach |
| 8,555,263 B2 | 10/2013 | Allen et al. |
| 8,560,502 B2 | 10/2013 | Vora |
| 8,595,151 B2 | 11/2013 | Hao et al. |
| 8,601,016 B2 | 12/2013 | Briggs et al. |
| 8,631,034 B1 | 1/2014 | Peloski |
| 8,650,182 B2 | 2/2014 | Murthy |
| 8,660,869 B2 | 2/2014 | MacIntyre et al. |
| 8,676,863 B1 | 3/2014 | Connell et al. |
| 8,683,488 B2 | 3/2014 | Kukreja et al. |
| 8,713,518 B2 | 4/2014 | Pointer et al. |
| 8,719,252 B2 | 5/2014 | Miranker et al. |
| 8,725,707 B2 | 5/2014 | Chen et al. |
| 8,726,254 B2 | 5/2014 | Rohde et al. |
| 8,745,014 B2 | 6/2014 | Travis |
| 8,745,510 B2 | 6/2014 | D'Alo' et al. |
| 8,751,823 B2 | 6/2014 | Myles et al. |
| 8,768,961 B2 | 7/2014 | Krishnamurthy |
| 8,788,254 B2 | 7/2014 | Peloski |
| 8,793,243 B2 | 7/2014 | Weyerhaeuser et al. |
| 8,805,947 B1 | 8/2014 | Kuzkin et al. |
| 8,806,133 B2 | 8/2014 | Hay et al. |
| 8,812,625 B1 | 8/2014 | Chitilian et al. |
| 8,838,656 B1 | 9/2014 | Cheriton |
| 8,855,999 B1 | 10/2014 | Elliot |
| 8,863,156 B1 | 10/2014 | Lepanto et al. |
| 8,874,512 B2 | 10/2014 | Jin et al. |
| 8,880,569 B2 | 11/2014 | Draper et al. |
| 8,880,787 B1 | 11/2014 | Kimmel et al. |
| 8,881,121 B2 | 11/2014 | Ali |
| 8,886,631 B2 | 11/2014 | Abadi et al. |
| 8,903,717 B2 | 12/2014 | Elliot |
| 8,903,842 B2 | 12/2014 | Bloesch et al. |
| 8,922,579 B2 | 12/2014 | Mi et al. |
| 8,924,384 B2 | 12/2014 | Driesen et al. |
| 8,930,892 B2 | 1/2015 | Pointer et al. |
| 8,954,418 B2 | 2/2015 | Faerber et al. |
| 8,959,495 B2 | 2/2015 | Chafi et al. |
| 8,996,864 B2 | 3/2015 | Maigne et al. |
| 9,031,930 B2 | 5/2015 | Valentin |
| 9,077,611 B2 | 7/2015 | Cordray et al. |
| 9,122,765 B1 | 9/2015 | Chen |
| 9,195,712 B2 | 11/2015 | Freedman et al. |
| 9,298,768 B2 | 3/2016 | Varakin et al. |
| 9,311,357 B2 | 4/2016 | Ramesh et al. |
| 9,372,671 B2 | 6/2016 | Balan et al. |
| 9,384,184 B2 | 7/2016 | Cervantes et al. |
| 9,613,018 B2 | 4/2017 | Zeldis et al. |
| 9,633,060 B2* | 4/2017 | Caudy ............... G06F 17/30368 |
| 9,832,068 B2 | 11/2017 | McSherry et al. |
| 2002/0002576 A1 | 1/2002 | Wollrath et al. |
| 2002/0007331 A1 | 1/2002 | Lo et al. |
| 2002/0054587 A1 | 5/2002 | Baker et al. |
| 2002/0065981 A1 | 5/2002 | Jenne et al. |
| 2002/0129168 A1* | 9/2002 | Kanai ..................... H04L 29/06 709/213 |
| 2002/0156722 A1 | 10/2002 | Greenwood |
| 2003/0004952 A1 | 1/2003 | Nixon et al. |
| 2003/0061216 A1 | 3/2003 | Moses |
| 2003/0074400 A1 | 4/2003 | Brooks et al. |
| 2003/0110416 A1 | 6/2003 | Morrison et al. |
| 2003/0167261 A1 | 9/2003 | Grust et al. |
| 2003/0182261 A1 | 9/2003 | Patterson |
| 2003/0208484 A1 | 11/2003 | Chang et al. |
| 2003/0208505 A1 | 11/2003 | Mullins et al. |
| 2003/0233632 A1 | 12/2003 | Aigen et al. |
| 2004/0002961 A1 | 1/2004 | Dettinger et al. |
| 2004/0076155 A1 | 4/2004 | Yajnik et al. |
| 2004/0111492 A1 | 6/2004 | Nakahara et al. |
| 2004/0148630 A1 | 7/2004 | Choi |
| 2004/0186813 A1 | 9/2004 | Tedesco et al. |
| 2004/0216150 A1 | 10/2004 | Scheifler et al. |
| 2004/0220923 A1 | 11/2004 | Nica |
| 2004/0254876 A1 | 12/2004 | Coval et al. |
| 2005/0015490 A1 | 1/2005 | Saare et al. |
| 2005/0060693 A1 | 3/2005 | Robison et al. |
| 2005/0097447 A1 | 5/2005 | Serra et al. |
| 2005/0102284 A1 | 5/2005 | Srinivasan et al. |
| 2005/0102636 A1 | 5/2005 | McKeon et al. |
| 2005/0131893 A1 | 6/2005 | Glan |
| 2005/0132384 A1 | 6/2005 | Morrison et al. |
| 2005/0138624 A1 | 6/2005 | Morrison et al. |
| 2005/0165866 A1 | 7/2005 | Bohannon et al. |
| 2005/0198001 A1 | 9/2005 | Cunningham et al. |
| 2006/0059253 A1 | 3/2006 | Goodman et al. |
| 2006/0074901 A1 | 4/2006 | Pirahesh et al. |
| 2006/0085490 A1 | 4/2006 | Baron et al. |
| 2006/0100989 A1 | 5/2006 | Chinchwadkar et al. |
| 2006/0101019 A1 | 5/2006 | Nelson et al. |
| 2006/0116983 A1 | 6/2006 | Dettinger et al. |
| 2006/0116999 A1 | 6/2006 | Dettinger et al. |
| 2006/0136361 A1 | 6/2006 | Peri et al. |
| 2006/0173693 A1 | 8/2006 | Arazi et al. |
| 2006/0195460 A1 | 8/2006 | Nori et al. |
| 2006/0212847 A1 | 9/2006 | Tarditi et al. |
| 2006/0218123 A1 | 9/2006 | Chowdhuri et al. |
| 2006/0218200 A1 | 9/2006 | Factor et al. |
| 2006/0230016 A1 | 10/2006 | Cunningham et al. |
| 2006/0253311 A1 | 11/2006 | Yin et al. |
| 2006/0271510 A1 | 11/2006 | Harward et al. |
| 2006/0277162 A1 | 12/2006 | Smith |
| 2007/0011211 A1 | 1/2007 | Reeves et al. |
| 2007/0027884 A1 | 2/2007 | Heger et al. |
| 2007/0033518 A1 | 2/2007 | Kenna et al. |
| 2007/0073765 A1 | 3/2007 | Chen |
| 2007/0101252 A1 | 5/2007 | Chamberlain et al. |
| 2007/0169003 A1 | 7/2007 | Branda et al. |
| 2007/0256060 A1 | 11/2007 | Ryu et al. |
| 2007/0258508 A1 | 11/2007 | Werb et al. |
| 2007/0271280 A1 | 11/2007 | Chandasekaran |
| 2007/0299822 A1 | 12/2007 | Jopp et al. |
| 2008/0022136 A1 | 1/2008 | Mattsson et al. |
| 2008/0033907 A1 | 2/2008 | Woehler et al. |
| 2008/0046804 A1 | 2/2008 | Rui et al. |
| 2008/0072150 A1 | 3/2008 | Chan et al. |
| 2008/0120283 A1 | 5/2008 | Liu et al. |
| 2008/0155565 A1 | 6/2008 | Poduri |
| 2008/0168135 A1 | 7/2008 | Redlich et al. |
| 2008/0235238 A1 | 9/2008 | Jalobeanu et al. |
| 2008/0263179 A1 | 10/2008 | Buttner et al. |
| 2008/0276241 A1 | 11/2008 | Bajpai et al. |
| 2008/0319951 A1 | 12/2008 | Ueno et al. |
| 2009/0019029 A1 | 1/2009 | Tommaney et al. |
| 2009/0022095 A1 | 1/2009 | Spaur et al. |
| 2009/0037391 A1 | 2/2009 | Agrawal et al. |
| 2009/0055370 A1 | 2/2009 | Dagum et al. |

(56) References Cited

U.S. PATENT DOCUMENTS

| | | |
|---|---|---|
| 2009/0083215 A1 | 3/2009 | Burger |
| 2009/0089312 A1 | 4/2009 | Chi et al. |
| 2009/0248902 A1 | 10/2009 | Blue |
| 2009/0254516 A1 | 10/2009 | Meiyyappan et al. |
| 2009/0300770 A1 | 12/2009 | Rowney et al. |
| 2009/0319058 A1 | 12/2009 | Rovaglio et al. |
| 2009/0319484 A1 | 12/2009 | Golbandi et al. |
| 2009/0327242 A1 | 12/2009 | Brown et al. |
| 2010/0036801 A1 | 2/2010 | Pirvali et al. |
| 2010/0042587 A1 | 2/2010 | Johnson et al. |
| 2010/0047760 A1 | 2/2010 | Best et al. |
| 2010/0049715 A1 | 2/2010 | Jacobsen et al. |
| 2010/0161555 A1 | 6/2010 | Nica et al. |
| 2010/0186082 A1 | 7/2010 | Ladki et al. |
| 2010/0199161 A1 | 8/2010 | Aureglia et al. |
| 2010/0205017 A1 | 8/2010 | Sichelman et al. |
| 2010/0205351 A1 | 8/2010 | Wiener et al. |
| 2010/0281005 A1 | 11/2010 | Carlin et al. |
| 2010/0281071 A1 | 11/2010 | Ben-Zvi et al. |
| 2011/0126110 A1 | 5/2011 | Vilke et al. |
| 2011/0126154 A1 | 5/2011 | Boehler et al. |
| 2011/0153603 A1 | 6/2011 | Adiba et al. |
| 2011/0161378 A1 | 6/2011 | Williamson |
| 2011/0167020 A1 | 7/2011 | Yang et al. |
| 2011/0178984 A1 | 7/2011 | Talius et al. |
| 2011/0194563 A1 | 8/2011 | Shen et al. |
| 2011/0219020 A1 | 9/2011 | Oks et al. |
| 2011/0314019 A1 | 12/2011 | Pens |
| 2012/0110030 A1 | 5/2012 | Pomponio |
| 2012/0144234 A1 | 6/2012 | Clark et al. |
| 2012/0159303 A1 | 6/2012 | Friedrich et al. |
| 2012/0191446 A1 | 7/2012 | Binsztok et al. |
| 2012/0192096 A1 | 7/2012 | Bowman et al. |
| 2012/0197868 A1 | 8/2012 | Fauser et al. |
| 2012/0209886 A1 | 8/2012 | Henderson |
| 2012/0215741 A1 | 8/2012 | Poole et al. |
| 2012/0221528 A1 | 8/2012 | Renkes |
| 2012/0246052 A1 | 9/2012 | Taylor et al. |
| 2012/0254143 A1 | 10/2012 | Varma et al. |
| 2012/0259759 A1 | 10/2012 | Crist et al. |
| 2012/0296846 A1 | 11/2012 | Teeter |
| 2013/0041946 A1 | 2/2013 | Joel et al. |
| 2013/0080514 A1 | 3/2013 | Gupta et al. |
| 2013/0086107 A1 | 4/2013 | Genochio et al. |
| 2013/0166556 A1 | 6/2013 | Baeumges et al. |
| 2013/0173667 A1 | 7/2013 | Soderberg et al. |
| 2013/0179460 A1 | 7/2013 | Cervantes et al. |
| 2013/0185619 A1 | 7/2013 | Ludwig |
| 2013/0191370 A1 | 7/2013 | Chen et al. |
| 2013/0198232 A1 | 8/2013 | Shamgunov et al. |
| 2013/0226959 A1 | 8/2013 | Dittrich et al. |
| 2013/0246560 A1 | 9/2013 | Feng et al. |
| 2013/0263123 A1 | 10/2013 | Zhou et al. |
| 2013/0290243 A1 | 10/2013 | Hazel et al. |
| 2013/0304725 A1 | 11/2013 | Nee et al. |
| 2013/0304744 A1 | 11/2013 | McSherry et al. |
| 2013/0311352 A1 | 11/2013 | Kayanuma et al. |
| 2013/0311488 A1 | 11/2013 | Erdogan et al. |
| 2013/0318129 A1 | 11/2013 | Vingralek et al. |
| 2013/0346365 A1 | 12/2013 | Kan et al. |
| 2014/0019494 A1 | 1/2014 | Tang |
| 2014/0040203 A1 | 2/2014 | Lu et al. |
| 2014/0059646 A1 | 2/2014 | Hannel et al. |
| 2014/0082724 A1 | 3/2014 | Pearson et al. |
| 2014/0136521 A1 | 5/2014 | Pappas |
| 2014/0143123 A1 | 5/2014 | Banke et al. |
| 2014/0149997 A1 | 5/2014 | Kukreja et al. |
| 2014/0156618 A1 | 6/2014 | Castellano |
| 2014/0173023 A1 | 6/2014 | Varney et al. |
| 2014/0181036 A1 | 6/2014 | Dhamankar et al. |
| 2014/0181081 A1 | 6/2014 | Veldhuizen |
| 2014/0188924 A1 | 7/2014 | Ma et al. |
| 2014/0195558 A1 | 7/2014 | Murthy et al. |
| 2014/0201194 A1 | 7/2014 | Reddy et al. |
| 2014/0215446 A1 | 7/2014 | Araya et al. |
| 2014/0222768 A1 | 8/2014 | Rambo et al. |
| 2014/0229506 A1 | 8/2014 | Lee |
| 2014/0229874 A1 | 8/2014 | Strauss |
| 2014/0244687 A1 | 8/2014 | Shmueli et al. |
| 2014/0279810 A1 | 9/2014 | Mann et al. |
| 2014/0280522 A1 | 9/2014 | Watte |
| 2014/0282227 A1 | 9/2014 | Nixon et al. |
| 2014/0282444 A1 | 9/2014 | Araya et al. |
| 2014/0282540 A1 | 9/2014 | Bonnet et al. |
| 2014/0297611 A1 | 10/2014 | Abbour et al. |
| 2014/0317084 A1 | 10/2014 | Chaudhry et al. |
| 2014/0324821 A1 | 10/2014 | Meiyyappan et al. |
| 2014/0330700 A1 | 11/2014 | Studnitzer et al. |
| 2014/0330807 A1 | 11/2014 | Weyerhaeuser et al. |
| 2014/0344186 A1 | 11/2014 | Nadler |
| 2014/0344391 A1 | 11/2014 | Varney et al. |
| 2014/0359574 A1 | 12/2014 | Beckwith et al. |
| 2014/0372482 A1 | 12/2014 | Martin et al. |
| 2014/0380051 A1 | 12/2014 | Edward et al. |
| 2015/0019516 A1 | 1/2015 | Wein et al. |
| 2015/0026155 A1 | 1/2015 | Martin |
| 2015/0067640 A1 | 3/2015 | Booker et al. |
| 2015/0074066 A1 | 3/2015 | Li et al. |
| 2015/0082218 A1 | 3/2015 | Affoneh et al. |
| 2015/0088894 A1 | 3/2015 | Czarlinska et al. |
| 2015/0095381 A1 | 4/2015 | Chen et al. |
| 2015/0127599 A1 | 5/2015 | Schiebeler |
| 2015/0154262 A1 | 6/2015 | Yang et al. |
| 2015/0172117 A1 | 6/2015 | Dolinsky et al. |
| 2015/0188778 A1 | 7/2015 | Asayag et al. |
| 2015/0205588 A1 | 7/2015 | Bates et al. |
| 2015/0254298 A1 | 9/2015 | Bourbonnais et al. |
| 2015/0304182 A1 | 10/2015 | Brodsky et al. |
| 2015/0317359 A1 | 11/2015 | Tran et al. |
| 2016/0026442 A1 | 1/2016 | Chhaparia |
| 2016/0065670 A1 | 3/2016 | Kimmel et al. |
| 2016/0092599 A1 | 3/2016 | Barsness et al. |
| 2016/0125018 A1 | 5/2016 | Tomoda et al. |
| 2016/0171070 A1 | 6/2016 | Hrle et al. |
| 2016/0253294 A1 | 9/2016 | Allen et al. |
| 2016/0316038 A1 | 10/2016 | Jolfaei |
| 2016/0335330 A1 | 11/2016 | Teodorescu et al. |
| 2016/0335361 A1 | 11/2016 | Teodorescu et al. |
| 2017/0161514 A1 | 6/2017 | Dettinger et al. |

FOREIGN PATENT DOCUMENTS

| | | |
|---|---|---|
| EP | 1198769 B1 | 6/2008 |
| EP | 2199961 A1 | 6/2010 |
| EP | 2423816 A1 | 2/2012 |
| EP | 2743839 A1 | 6/2014 |
| RU | 2421798 | 6/2011 |
| WO | 2000000879 A2 | 1/2000 |
| WO | 2001079964 A2 | 10/2001 |
| WO | 2011120161 A1 | 10/2011 |
| WO | 2012136627 A1 | 10/2012 |
| WO | 2014026220 A1 | 2/2014 |
| WO | 2014143208 A1 | 9/2014 |

OTHER PUBLICATIONS

"Change Data Capture", Oracle Database Online Documentation 11g Release 1 (11.1), dated Apr. 5, 2016. Retreived rom https://web.archive.org/web/20160405032625/http://docs.oracle.com/cd/B28359_01/server.111/b28313/cdc.htm.

"Chapter 24. Query access plans", Tuning Database Performance, DB2 Version 9.5 for Linux, UNIX, and Windows, pp. 301-462, dated Dec. 2010. Retrieved from http://public.dhe.ibm.com/ps/products/db2/info/vr95/pdf/en_US/DB2PerfTuneTroubleshoot-db2d3e953.pdf.

"GNU Emacs Manual", dated Apr. 15, 2016, pp. 43-47. Retrieved from https://web.archive.org/web/20160415175915/http://www.gnu.org/software/emacs/manual/html_mono/emacs.html.

"Google Protocol RPC Library Overview", dated Apr. 27, 2016. Retrieved from https://cloud.google.com/appengine/docs/python/tools/protorpc/ (last accessed Jun. 16, 2016).

(56) References Cited

OTHER PUBLICATIONS

"IBM—What is HBase?", dated Sep. 6, 2015. Retrieved from https://web.archive.org/web/20150906022050/http://www-01.ibm.com/software/data/infosphere/hadoop/hbase/.
"IBM Informix TimeSeries data management", dated Jan. 18, 2016. Retrieved from https://web.archive.org/web/20160118072141/http://www-01.ibm.com/software/data/informix/timeseries/.
"IBM InfoSphere BigInsights 3.0.0—Importing data from and exporting data to DB2 by using Sqoop", dated Jan. 15, 2015. Retrieved from https://web.archive.org/web/20150115034058/http://www-01.ibm.com/support/knowledgecenter/SSPT3X_3.0.0/com.ibm.swg.im.infosphere.biginsights.import.doc/doc/data_warehouse_sqoop.html.
"Maximize Data Value with Very Large Database Management by SAP Sybase IQ", dated 2013. Retrieved from http://www.sap.com/bin/sapcom/en_us/downloadasset.2013-06-jun-11-11.maximize-data-value-with-very-large-database-management-by-sap-sybase-iq-pdf.html.
"Microsoft Azure—Managing Access Control Lists (ACLs) for Endpoints by using PowerShell", dated Nov. 12, 2014. Retrieved from https://web.archive.org/web/20150110170715/http://msdn.microsoft.com/en-us/library/azure/dn376543.aspx.
"Oracle Big Data Appliance—Perfect Balance Java API", dated Sep. 20, 2015. Retrieved from https://web.archive.org/web/20131220040005/http://docs.oracle.com/cd/E41604_01/doc.22/e41667/toc.htm.
"Oracle Big Data Appliance—X5-2", dated Sep. 6, 2015. Retrieved from https://web.archive.org/web/20150906185409/http://www.oracle.com/technetwork/database/bigdata-appliance/overview/bigdataappliance-datasheet-1883358.pdf.
"Oracle Big Data Appliance Software User's Guide", dated Feb. 2015. Retrieved from https://docs.oracle.com/cd/E55905_01/doc.40/e55814.pdf.
"SAP HANA Administration Guide", dated Mar. 29, 2016, pp. 290-294. Retrieved from https://web.archive.org/web/20160417053656/http://help.sap.com/hana/SAP_HANA_Administration_Guide_en.pdf.
"Sophia Database—Architecture", dated Jan. 18, 2016. Retrieved from https://web.archive.org/web/20160118052919/http://sphia.org/architecture.html.
"Tracking Data Changes", SQL Server 2008 R2, dated Sep. 22, 2015. Retreived from https://web.archive.org/web/20150922000614/https://technet.microsoft.com/en-us/library/bb933994(v=sql.105).aspx.
"Use Formula AutoComplete", dated 2010. Retrieved from https://support.office.com/en-us/article/Use-Formula-AutoComplete-c7c46fa6-3a94-4150-a2f7-34140c1ee4d9 (last accessed Jun. 16, 2016).
Adelfio et al. "Schema Extraction for Tabular Data on the Web", Proceedings of the VLDB Endowment, vol. 6, No. 6. Apr. 2013. Retrieved from http://www.cs.umd.edu/~hjs/pubs/spreadsheets-vldb13.pdf.
Advisory Action dated Apr. 19, 2017, in U.S. Appl. No. 15/154,999.
Advisory Action dated Apr. 20, 2017, in U.S. Appl. No. 15/154,980.
Advisory Action dated Apr. 6, 2017, in U.S. Appl. No. 15/154,995.
Advisory Action dated Mar. 31, 2017, in U.S. Appl. No. 15/154,996.
Advisory Action dated May 3, 2017, in U.S. Appl. No. 15/154,993.
Borror, Jefferey A. "Q for Mortals 2.0", dated Nov. 1, 2011. Retrieved from http://code.la.com/wiki/JB:QforMortals2/contents.
Cheusheva, Svetlana. "How to change the row color based on a cell's value in Excel", dated Oct. 29, 2013. Retrieved from https://www.ablebits.com/office-addins-blog/2013/10/29/excel-change-row-background-color/ (last accessed Jun. 16, 2016).
Corrected Notice of Allowability dated Aug. 9, 2017, in U.S. Appl. No. 15/154,980.
Corrected Notice of Allowability dated Jul. 31, 2017, in U.S. Appl. No. 15/154,999.
Corrected Notice of Allowability dated Mar. 10, 2017, in U.S. Appl. No. 15/154,979.
Corrected Notice of Allowability dated Oct. 26, 2017, in U.S. Appl. No. 15/610,162.
Decision on Pre-Appeal Conference Request dated Nov. 20, 2017, in U.S. Appl. No. 15/154,997.
Ex Parte Quayle Action dated Aug. 8, 2016, in U.S. Appl. No. 15/154,999.
Final Office Action dated Apr. 10, 2017, in U.S. Appl. No. 15/155,006.
Final Office Action dated Dec. 19, 2016, in U.S. Appl. No. 15/154,995.
Final Office Action dated Feb. 24, 2017, in U.S. Appl. No. 15/154,993.
Final Office Action dated Jan. 27, 2017, in U.S. Appl. No. 15/154,980.
Final Office Action dated Jan. 31, 2017, in U.S. Appl. No. 15/154,996.
Final Office Action dated Jul. 27, 2017, in U.S. Appl. No. 15/154,993.
Final Office Action dated Jun. 23, 2017, in U.S. Appl. No. 15/154,997.
Final Office Action dated Mar. 1, 2017, in U.S. Appl. No. 15/154,975.
Final Office Action dated Mar. 13, 2017, in U.S. Appl. No. 15/155,012.
Final Office Action dated Mar. 31, 2017, in U.S. Appl. No. 15/155,005.
Final Office Action dated May 15, 2017, in U.S. Appl. No. 15/155,010.
Final Office Action dated May 4, 2017, in U.S. Appl. No. 15/155,009.
Gai, Lei et al. "An Efficient Summary Graph Driven Method for RDF Query Processing", dated Oct. 27, 2015. Retreived from http://arxiv.org/pdf/1510.07749.pdf.
International Search Report and Written Opinion dated Aug. 18, 2016, in International Appln. No. PCT/US2016/032582 filed May 14, 2016.
International Search Report and Written Opinion dated Aug. 18, 2016, in International Appln. No. PCT/US2016/032584 filed May 14, 2016.
International Search Report and Written Opinion dated Aug. 18, 2016, in International Appln. No. PCT/US2016/032588 filed May 14, 2016.
International Search Report and Written Opinion dated Aug. 18, 2016, in International Appln. No. PCT/US2016/032593 filed May 14, 2016.
International Search Report and Written Opinion dated Aug. 18, 2016, in International Appln. No. PCT/US2016/032597 filed May 14, 2016.
International Search Report and Written Opinion dated Aug. 18, 2016, in International Appln. No. PCT/US2016/032599 filed May 14, 2016.
International Search Report and Written Opinion dated Aug. 18, 2016, in International Appln. No. PCT/US2016/032605 filed May 14, 2016.
International Search Report and Written Opinion dated Aug. 25, 2016, in International Appln. No. PCT/US2016/032590 filed May 14, 2016.
International Search Report and Written Opinion dated Aug. 25, 2016, in International Appln. No. PCT/US2016/032592 filed May 14, 2016.
International Search Report and Written Opinion dated Aug. 4, 2016, in International Appln. No. PCT/US2016/032581 filed May 14, 2016.
International Search Report and Written Opinion dated Jul. 28, 2016, in International Appln. No. PCT/US2016/032586 filed May 14, 2016.
International Search Report and Written Opinion dated Jul. 28, 2016, in International Appln. No. PCT/US2016/032587 filed May 14, 2016.
Search Report and Written Opinion dated Jul. 28, 2016, in International Appln. No. PCT/US2016/032589 filed May 14, 2016.

(56) References Cited

OTHER PUBLICATIONS

International Search Report and Written Opinion dated Sep. 1, 2016, in International Appln. No. PCT/US2016/032596 filed May 14, 2016.
International Search Report and Written Opinion dated Sep. 1, 2016, in International Appln. No. PCT/US2016/032598 filed May 14, 2016.
International Search Report and Written Opinion dated Sep. 1, 2016, in International Appln. No. PCT/US2016/032601 filed May 14, 2016.
International Search Report and Written Opinion dated Sep. 1, 2016, in International Appln. No. PCT/US2016/032602 filed May 14, 2016.
International Search Report and Written Opinion dated Sep. 1, 2016, in International Appln. No. PCT/US2016/032607 filed May 14, 2016.
International Search Report and Written Opinion dated Sep. 15, 2016, in International Appln. No. PCT/US2016/032591 filed May 14, 2016.
International Search Report and Written Opinion dated Sep. 15, 2016, in International Appln. No. PCT/US2016/032594 filed May 14, 2016.
International Search Report and Written Opinion dated Sep. 15, 2016, in International Appln. No. PCT/US2016/032600 filed May 14, 2016.
International Search Report and Written Opinion dated Sep. 29, 2016, in International Appln. No. PCT/US2016/032595 filed May 14, 2016.
International Search Report and Written Opinion dated Sep. 29, 2016, in International Appln. No. PCT/US2016/032606 filed May 14, 2016.
International Search Report and Written Opinion dated Sep. 8, 2016, in International Appln. No. PCT/US2016/032603 filed May 14, 2016.
International Search Report and Written Opinion dated Sep. 8, 2016, in International Appln. No. PCT/US2016/032604 filed May 14, 2016.
Jellema, Lucas. "Implementing Cell Highlighting in JSF-based Rich Enterprise Apps (Part 1)", dated Nov. 2008. Retrieved from http://www.oracle.com/technetwork/articles/adf/jellema-adfcellhighlighting-087850.html (last accessed Jun. 16, 2016).
Lou, Yuan. "A Multi-Agent Decision Support System for Stock Trading", IEEE Network, Jan./Feb. 2002. Retreived from http://www.reading.ac.uk/AcaDepts/si/sisweb13/ais/papers/journal12-A%20multi-agent%20Framework.pdf.
Mallet, "Relational Database Support for Spatia-Temporal Data", Technical Report TR 04-21, Sep. 2004, University of Alberta, Department of Computing Science.
Mariyappan, Balakrishnan. "10 Useful Linux Bash_Completion Complete Command Examples (Bash Command Line Completion on Steroids)", dated Dec. 2, 2013. Retrieved from http://www.thegeekstuff.com/2013/12/bash-completion-complete/ (last accessed Jun. 16, 2016).
Murray, Derek G. et al. "Naiad: a timely dataflow system." SOSP '13 Proceedings of the Twenty-Fourth ACM Symposium on Operating Systems Principles. pp. 439-455. Nov. 2013.
Non-final Office Action dated Apr. 19, 2017, in U.S. Appl. No. 15/154,974.
Non-final Office Action dated Aug. 12, 2016, in U.S. Appl. No. 15/155,001.
Non-final Office Action dated Aug. 16, 2016, in U.S. Appl. No. 15/154,993.
Non-final Office Action dated Aug. 19, 2016, in U.S. Appl. No. 15/154,991.
Non-final Office Action dated Aug. 25, 2016, in U.S. Appl. No. 15/154,980.
Non-final Office Action dated Aug. 26, 2016, in U.S. Appl. No. 15/154,995.
Non-final Office Action dated Aug. 8, 2016, in U.S. Appl. No. 15/154,981.
Non-final Office Action dated Aug. 8, 2016, in U.S. Appl. No. 15/154,985.
Non-final Office Action dated Dec. 13, 2017, in U.S. Appl. No. 15/608,963.
Non-final Office Action dated Feb. 8, 2017, in U.S. Appl. No. 15/154,997.
Non-final Office Action dated Jul. 27, 2017, in U.S. Appl. No. 15/154,995.
Non-final Office Action dated Mar. 2, 2017, in U.S. Appl. No. 15/154,984.
Non-final Office Action dated Nov. 15, 2017, in U.S. Appl. No. 15/654,461.
Non-final Office Action dated Nov. 17, 2016, in U.S. Appl. No. 15/154,999.
Non-final Office Action dated Nov. 21, 2017, in U.S. Appl. No. 15/155,005.
Non-final Office Action dated Nov. 30, 2017, in U.S. Appl. No. 15/155,012.
Non-final Office Action dated Oct. 13, 2016, in U.S. Appl. No. 15/155,009.
Non-final Office Action dated Oct. 27, 2016, in U.S. Appl. No. 15/155,006.
Non-final Office Action dated Oct. 5, 2017, in U.S. Appl. No. 15/428,145.
Non-final Office Action dated Oct. 7, 2016, in U.S. Appl. No. 15/154,998.
Non-final Office Action dated Sep. 1, 2016, in U.S. Appl. No. 15/154,979.
Non-final Office Action dated Sep. 1, 2016, in U.S. Appl. No. 15/155,011.
Non-final Office Action dated Sep. 1, 2016, in U.S. Appl. No. 15/155,012.
Non-final Office Action dated Sep. 14, 2016, in U.S. Appl. No. 15/154,984.
Non-final Office Action dated Sep. 16, 2016, in U.S. Appl. No. 15/154,988.
Non-final Office Action dated Sep. 22, 2016, in U.S. Appl. No. 15/154,987.
Non-final Office Action dated Sep. 26, 2016, in U.S. Appl. No. 15/155,005.
Non-final Office Action dated Sep. 29, 2016, in U.S. Appl. No. 15/154,990.
Non-final Office Action dated Sep. 8, 2016, in U.S. Appl. No. 15/154,975.
Non-final Office Action dated Sep. 9, 2016, in U.S. Appl. No. 15/154,996.
Non-final Office Action dated Sep. 9, 2016, in U.S. Appl. No. 15/155,010.
Notice of Allowance dated Dec. 19, 2016, in U.S. Appl. No. 15/155,001.
Notice of Allowance dated Dec. 22, 2016, in U.S. Appl. No. 15/155,011.
Notice of Allowance dated Dec. 7, 2016, in U.S. Appl. No. 15/154,985.
Notice of Allowance dated Feb. 1, 2017, in U.S. Appl. No. 15/154,988.
Notice of Allowance dated Feb. 14, 2017, in U.S. Appl. No. 15/154,979.
Notice of Allowance dated Feb. 28, 2017, in U.S. Appl. No. 15/154,990.
Notice of Allowance dated Jan. 30, 2017, in U.S. Appl. No. 15/154,987.
Notice of Allowance dated Jul. 28, 2017, in U.S. Appl. No. 15/155,009.
Notice of Allowance dated Jun. 19, 2017, in U.S. Appl. No. 15/154,980.
Notice of Allowance dated Jun. 20, 2017, in U.S. Appl. No. 15/154,975.
Notice of Allowance dated Mar. 2, 2017, in U.S. Appl. No. 15/154,998.
Notice of Allowance dated Mar. 31, 2017, in U.S. Appl. No. 15/154,998.

(56) References Cited

OTHER PUBLICATIONS

Notice of Allowance dated May 10, 2017, in U.S. Appl. No. 15/154,988.
Notice of Allowance dated Nov. 17, 2016, in U.S. Appl. No. 15/154,991.
Notice of Allowance dated Nov. 17, 2017, in U.S. Appl. No. 15/154,993.
Notice of Allowance dated Nov. 21, 2016, in U.S. Appl. No. 15/154,983.
Notice of Allowance dated Nov. 8, 2016, in U.S. Appl. No. 15/155,007.
Notice of Allowance dated Oct. 11, 2016, in U.S. Appl. No. 15/155,007.
Notice of Allowance dated Oct. 21, 2016, in U.S. Appl. No. 15/154,999.
Notice of Allowance dated Oct. 6, 2017, in U.S. Appl. No. 15/610,162.
Palpanas, Themistoklis et al. "Incremental Maintenance for Non-Distributive Aggregate Functions", Proceedings of the 28th VLDB Conference, 2002. Retreived from http://www.vldb.org/conf/2002/S22P04.pdf.
PowerShell Team, Intellisense in Windows PowerShell ISE 3.0, dated Jun. 12, 2012, Windows PowerShell Blog, pp. 1-6 Retrieved: https://biogs.msdn.microsoft.com/powershell/2012/06/12/intellisense-in-windows-powershell-ise-3-0/.
Smith, Ian. "Guide to Using SQL: Computed and Automatic Columns." Rdb Jornal, dated Sep. 2008, retrieved Aug. 15, 2016, retrieved from the Internet <URL: http://www.oracle.com/technetwork/products/rdb/automatic-columns-132042.pdf>.
Wes McKinney & PyData Development Team. "pandas: powerful Python data analysis toolkit, Release 0.16.1" Dated May 11, 2015. Retrieved from: http://pandas.pydata.org/pandas-docs/version/0.16.1/index.html.
Wes McKinney & PyData Development Team. "pandas: powerful Python data analysis toolkit, Release 0.18.1" Dated May 3, 2016. Retrieved from: http://pandas.pydata.org/pandas-docs/version/0.18.1/index.html.
Wu, Buwen et al. "Scalable SPARQL Querying using Path Partitioning", 31st IEEE International Conference on Data Engineering (ICDE 2015), Seoul, Korea, Apr. 13-17, 2015. Retreived from http://imada.sdu.dk/~zhou/papers/icde2015.pdf.
Advisory Action dated Dec. 21, 2017, in U.S. Appl. No. 15/154,984.
Breitbart, Update Propagation Protocols for Replicated Databases, SIGMOD '99 Philadelphia PA, 1999, pp. 97-108.
Final Office Action dated Dec. 29, 2017, in U.S. Appl. No. 15/154,974.
Kramer, The Combining DAG: A Technique for Parallel Data Flow Analysis, IEEE Transactions on Parallel and Distributed Systems, vol. 5, No. 8, Aug. 1994, pp. 805-813.
Non-final Office Action dated Dec. 28, 2017, in U.S. Appl. No. 15/154,996.
Non-final Office Action dated Dec. 28, 2017, in U.S. Appl. No. 15/796,230.
Non-final Office Action dated Feb. 12, 2018, in U.S. Appl. No. 15/466,836.
Non-final Office Action dated Jan. 4, 2018, in U.S. Appl. No. 15/583,777.
Notice of Allowance dated Feb. 12, 2018, in U.S. Appl. No. 15/813,142.
Sobell, Mark G. "A Practical Guide to Linux, Commands, Editors and Shell Programming." Third Edition, dated Sep. 14, 2012. Retrieved from: http://techbus.safaribooksonline.com/book/operating-systems-and-server-administration/linux/9780133085129.

* cited by examiner

COMPUTER DATA DISTRIBUTION ARCHITECTURE

This application claims the benefit of U.S. Provisional Application No. 62/161,813, entitled "Computer Data System" and filed on May 14, 2015, which is incorporated herein by reference in its entirety.

Embodiments relate generally to computer data systems, and more particularly, to methods, systems and computer readable media for computer data distribution architecture.

Some conventional computer data systems may maintain data in one or more data sources that may include data objects such as tables. These conventional systems may include clients that independently access tables from each data source directly. In such data systems, a need may exist to provide systems and methods for an optimized composite table data service providing flexible data routing and caching across the various data sources for one or more clients, in order to reduce memory usage and to enable redundancy, high-availability, scalability, and rule-based data discovery.

Embodiments were conceived in light of the above mentioned needs, problems and/or limitations, among other things.

Some implementations can include a memory-efficient and processor-efficient computer system for reliable implementation of a table data cache proxy. The system can comprise a plurality of data server computers each being programmed with a table data service accessible via an electronic messaging protocol. The system can also comprise a table data cache proxy enabled (TDCP-enabled) server computer coupled to the one or more data server computers, the TDCP-enabled server computer having a plurality of TDCP clients, the TDCP-enabled server computer caching data from the plurality of data server computers and aggregating subscriptions of the TDCP clients to the plurality of data server computers. The TDCP-enabled server computer can comprise a cache memory device having at least a portion being a shared memory portion. The TDCP-enabled server computer can also comprise one or more hardware processors and a computer readable data storage device coupled to the one or more hardware processors, the computer readable data storage device having stored thereon software instructions that, when executed by the one or more hardware processors, cause the one or more hardware processors to perform operations. The operations can include receiving, from a first TDCP client of the plurality of TDCP clients, a first electronic message requesting table data. The operations can also include determining whether a shared memory cache stored in the shared memory portion of the cache memory device contains a cached copy of the requested table data.

The operations can further include, when the shared memory cache contains a cached copy of the requested table data, transmitting, to the first TDCP client, one or more second electronic messages comprising a reference indicating a location where the cached copy is stored in the shared memory portion of the cache memory device in response to the first electronic message, the data received from at least one of the plurality of data server computers and stored in the cache memory device being authoritative due to a data model of the plurality of data server computers. When the shared memory cache does not contain a cached copy of the requested table data, the operations can include selecting one or more data server computers from the plurality of data server computers as one or more appropriate data server computers to provide the requested table data. When the shared memory cache does not contain a cached copy of the requested table data, the operations can also include transmitting one or more third electronic messages to the one or more appropriate data server computers requesting the requested table data.

When the shared memory cache does not contain a cached copy of the requested table data, the operations can further include receiving one or more fourth electronic messages from the one or more appropriate data server computers in response to the third electronic messages. When the shared memory cache does not contain a cached copy of the requested table data, the operations can also include filtering the received fourth electronic messages and storing a result of the filtering in the shared memory portion of the cache memory device. When the shared memory cache does not contain a cached copy of the requested table data, the operations can additionally include transmitting, to the first TDCP client computer, one or more fifth electronic messages comprising a reference indicating a location where the result of the filtering is stored in the shared memory portion of the cache memory device in response to the first electronic message.

When the shared memory cache does not contain a cached copy of the requested table data, the operations can further include transmitting a request to subscribe for updates from the one or more appropriate data server computers; the operations can also include receiving a subscription update from one or more of the plurality of data server computers; and the operations can further include electronically distributing the received subscription update to one or more of the plurality of TDCP clients.

Some implementations can include a memory-efficient and processor-efficient computer system for reliable implementation of a table data cache proxy. The system can comprise at least one data server having a table data service accessible via an electronic messaging protocol. The system can also comprise a table data cache proxy enabled (TDCP-enabled) server coupled to the one or more data servers, the TDCP-enabled server caching data from the plurality of data servers and aggregating subscriptions to the plurality of data servers. The TDCP-enabled server can comprise one or more hardware processors and a computer readable data storage device coupled to the one or more hardware processors, the computer readable data storage device having stored thereon software instructions that, when executed by the one or more hardware processors, cause the one or more hardware processors to perform operations.

The operations can include receiving a first electronic message requesting table data. The operations can also include determining whether a cache of the TDCP-enabled server contains a cached copy of the requested table data. The operations can further include, when the cache of the TDCP-enabled server contains a cached copy of the requested table data, transmitting one or more second electronic messages providing the cached copy of the requested table data from the cache in response to the first electronic message, the data received from at least one of the plurality of data servers and stored in the cache being authoritative due to a data model of the plurality of data servers.

When the cache of the TDCP-enabled server does not contain a cached copy of the requested data: the operations can include determining one or more appropriate data servers of the plurality of data servers to request the requested table data from; the operations can also include transmitting one or more third electronic messages to the one or more appropriate data servers requesting the requested table data; the operations can further include receiving one or more fourth electronic messages from the one or more appropriate servers in response to the one or more third electronic messages; the operations can also include filtering the received one or more fourth electronic messages and, based on a result of the filtering, transmitting one or more fifth electronic messages providing the requested table data in response to the first electronic message.

The first electronic message can be received via an inter process communication (IPC) mechanism from a client, the one or more second electronic messages can be transmitted to the client via the IPC mechanism, and the one or more fifth electronic messages can be transmitted to the client via the IPC mechanism.

The TDCP-enabled server can comprise a shared memory in which at least a portion of the cache is stored. The one or more second electronic messages can comprise an indication where the cached copy is stored in the shared memory of the TDCP-enabled server, and the one or more fifth electronic messages can comprise indications where the requested table data is stored in the shared memory of the TDCP-enabled server.

Additionally or alternatively, first electronic message can be received via a network from a remote client, the one or more second electronic messages can be transmitted to the remote client via the network, and the one or more fifth electronic messages can be transmitted to the remote client via the network.

In any of the above-mentioned implementations, the operations can also include, when the first electronic message requests a block of binary data, determining whether a future request for another block of binary data is likely based on a number (and/or pattern) of received requests, and, when the future request is determined to be likely, prefetching the another block of binary data including transmitting one or more sixth electronic messages to the one or more appropriate data servers requesting the another block of binary data.

Some implementations can include a memory-efficient and processor-efficient computerized method for reliable implementation of a table data cache proxy. The method can include receiving, at a table data cache proxy enabled (TDCP-enabled) server, a first electronic message requesting table data, the TDCP-enabled server being coupled to one or more data servers having a table data service accessible via an electronic messaging protocol, the TDCP-enabled server caching data from the one or more data servers and aggregating subscriptions to the one or more data servers. The method can also include determining whether a cache of the TDCP-enabled server contains a cached copy of the requested table data. The method can further include, when the cache of the TDCP-enabled server contains a cached copy of the requested table data, transmitting one or more second electronic messages providing the cached copy of the requested table data from the cache in response to the first electronic message, the data received from at least one of the one or more data servers and stored in the cache being authoritative due to a data model of the one or more data servers.

When the cache of the TDCP-enabled server does not contain a cached copy of the requested data: the method can include determining one or more appropriate data servers of the one or more data servers to request the requested table data from; the method can also include transmitting one or more third electronic messages to the one or more appropriate data servers requesting the requested table data; the method can further include receiving one or more fourth electronic messages from the one or more appropriate servers in response to the one or more third electronic messages; and the method can also include filtering the received one or more fourth electronic messages and, based on a result of the filtering, transmitting one or more fifth electronic messages providing the requested table data in response to the first electronic message.

The method can include determining whether a future request for another block of binary data is likely based on a number (and/or pattern) of received requests; and when the future request is determined to be likely, the method can include prefetching the another block of binary data including transmitting one or more sixth electronic messages to the one or more appropriate data servers requesting the another block of binary data.

When the cache of the TDCP-enabled server does not contain a cached copy of the requested data: the method can include transmitting a request to subscribe for updates from the one or more appropriate data servers; the method can also include receiving a subscription update from one or more of the one or more data servers; and the method can further include electronically distributing the received subscription update to one or more subscribers of the TDCP-enabled server.

Some implementations can include a nontransitory computer readable medium having stored thereon software instructions that, when executed by one or more processors, cause the one or more processors to perform operations. The operations can include receiving, at a table data cache proxy enabled (TDCP-enabled) server, a first electronic message requesting table data, the TDCP-enabled server being coupled to one or more data servers having a table data service accessible via an electronic messaging protocol, the TDCP-enabled server caching data from the one or more data servers and aggregating subscriptions to the one or more data servers. The operations can also include determining whether a cache of the TDCP-enabled server contains a cached copy of the requested table data. When the cache of the TDCP-enabled server contains a cached copy of the requested table data, the operations can include transmitting one or more second electronic messages providing the cached copy of the requested table data from the cache in response to the first electronic message, the data received from at least one of the one or more data servers and stored in the cache being authoritative due to a data model of the one or more data servers. When the cache of the TDCP-enabled server does not contain a cached copy of the requested data: the operations can include determining one or more appropriate data servers of the one or more data servers to request the requested table data from; the operations can also include transmitting one or more third electronic messages to the one or more appropriate data servers requesting the requested table data; the operations can further include receiving one or more fourth electronic messages from the one or more appropriate servers in response to the one or more third electronic messages; and the operations can also include filtering the received one or more fourth electronic messages and, based on a result of the filtering, transmitting one or more fifth electronic messages providing the requested table data in response to the first electronic message.

The operations can include determining whether a future request for another block of binary data is likely based on a number of received requests, and when the future request is determined to be likely, prefetching the another block of binary data including transmitting one or more sixth electronic messages to the one or more appropriate data servers requesting the another block of binary data.

In any of the above-mentioned implementations, the first electronic message can request data from a data block and comprise a minimum response length, and when additional data above the minimum response length is available within the block, the additional data is included in response to the first electronic message to prevent redundant subsequent requests.

In any of the above-mentioned implementations, the first electronic message can be one of: a table location discovery request requesting a list of table locations for a given table key, the table key uniquely identifying a table; a table location metadata retrieval request requesting table-location-level metadata including the size of a table; a column location metadata retrieval request requesting column-location-level metadata, wherein column data is laid out in an optimized data layout to enable high performance data access, the column-location-level metadata including information indicating the optimized data layout; a column file size retrieval request requesting the size of a column file; and a column file data retrieval request requesting at least a portion of a block of binary data from a column file.

In any of the above-mentioned implementations, the at least one data server can be a plurality of data servers comprising at least two data sources providing the same data; and the TDCP-enabled server can be configured to reconnect to any of the data servers, and upon reconnection any in-progress requests are re-sent and any subscriptions are renewed.

In any of the above-mentioned implementations, the one or more data servers can comprise a plurality of data servers, and, when the first electronic message requests one or more data locations, the filtering can comprise combining at least a portion of each of two or more of the one or more fourth electronic messages to create a composite of data from two or more of the plurality of data servers as the result of the filtering.

DETAILED DESCRIPTION

Reference may be made herein to the Java programming language, Java classes, Java bytecode and the Java Virtual Machine (JVM) for purposes of illustrating example implementations. It will be appreciated that implementations can include other programming languages (e.g., groovy, Scala, R, Go, etc.), other programming language structures as an alternative to or in addition to Java classes (e.g., other language classes, objects, data structures, program units, code portions, script portions, etc.), other types of bytecode, object code and/or executable code, and/or other virtual machines or hardware implemented machines configured to execute a data system query.

Figure 1:
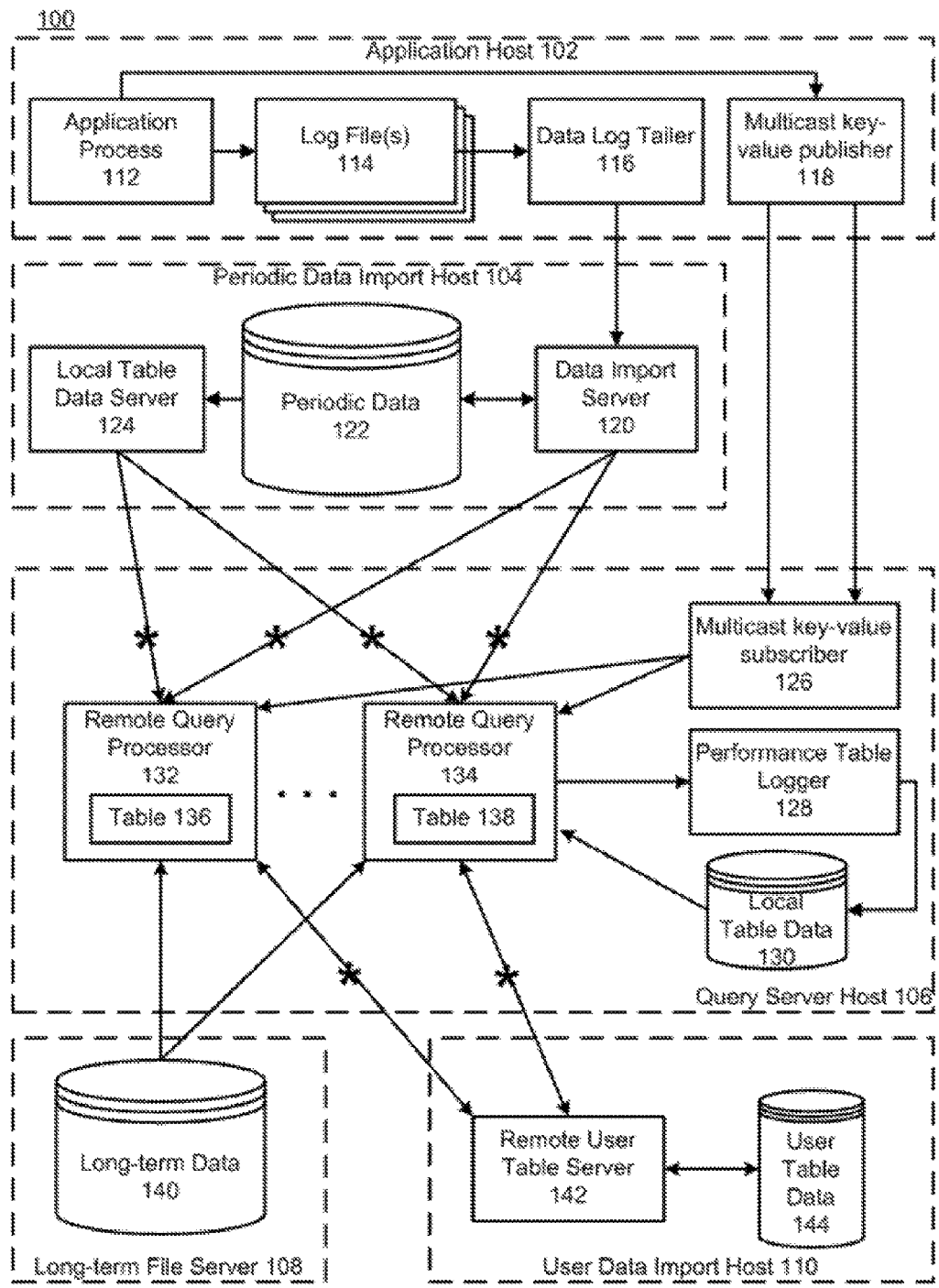
FIG. 1 is a diagram of an example computer data system showing an example data distribution configuration in accordance with some implementations.
Figure 2:
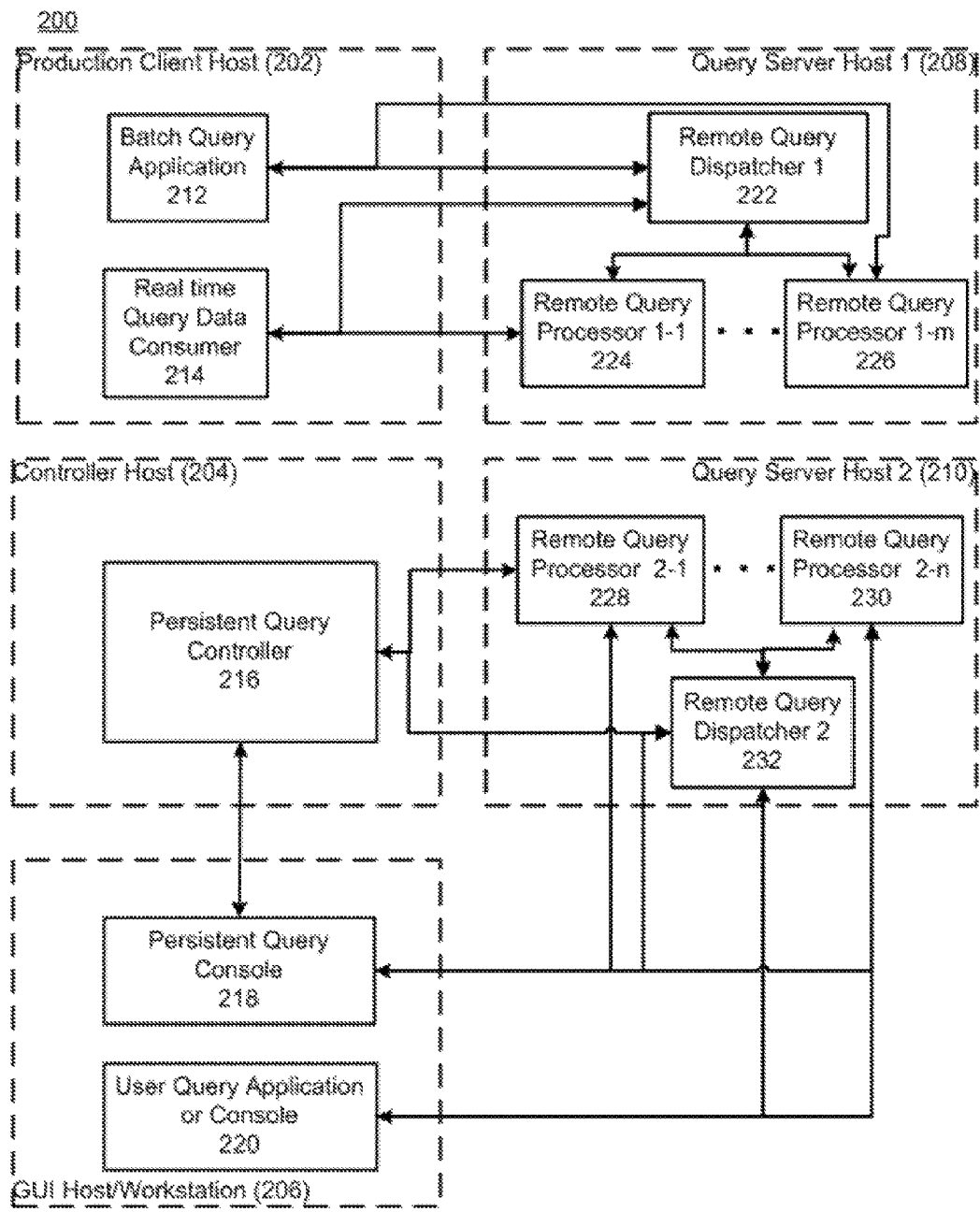
FIG. 2 is a diagram of an example computer data system showing an example administration/process control arrangement in accordance with some implementations.

FIG. 1 is a diagram of an example computer data system and network 100 showing an example data distribution configuration in accordance with some implementations. In particular, the system 100 includes an application host 102, a periodic data import host 104, a query server host 106, a long-term file server 108, and a user data import host 110. While tables are used as an example data object in the description below, it will be appreciated that the data system described herein can also process other data objects such as mathematical objects (e.g., a singular value decomposition of values in a given range of one or more rows and columns of a table), TableMap objects, etc. A TableMap object provides the ability to lookup a Table by some key. This key represents a unique value (or unique tuple of values) from the columns aggregated on in a byExternal( ) statement execution, for example. A TableMap object is can be the result of a byExternal( ) statement executed as part of a query. It will also be appreciated that the configurations shown in FIGS. 1 and 2 are for illustration purposes and in a given implementation each data pool (or data store) may be directly attached or may be managed by a file server.

The application host 102 can include one or more application processes 112, one or more log files 114 (e.g., sequential, row-oriented log files), one or more data log tailers 116 and a multicast key-value publisher 118. The periodic data import host 104 can include a local table data server, direct or remote connection to a periodic table data store 122 (e.g., a column-oriented table data store) and a data import server 120. The query server host 106 can include a multicast key-value subscriber 126, a performance table logger 128, local table data store 130 and one or more remote query processors (132, 134) each accessing one or more respective tables (136, 138). The long-term file server 108 can include a long-term data store 140. The user data import host 110 can include a remote user table server 142 and a user table data store 144. Row-oriented log files and column-oriented table data stores are discussed herein for illustration purposes and are not intended to be limiting. It will be appreciated that log files and/or data stores may be configured in other ways. In general, any data stores discussed herein could be configured in a manner suitable for a contemplated implementation.

In operation, the input data application process 112 can be configured to receive input data from a source (e.g., a securities trading data source), apply schema-specified, generated code to format the logged data as it's being prepared for output to the log file 114 and store the received data in the sequential, row-oriented log file 114 via an optional data logging process. In some implementations, the data logging process can include a daemon, or background process task, that is configured to log raw input data received from the application process 112 to the sequential, row-oriented log files on disk and/or a shared memory queue (e.g., for sending data to the multicast publisher 118). Logging raw input data to log files can additionally serve to provide a backup copy of data that can be used in the event that downstream processing of the input data is halted or interrupted or otherwise becomes unreliable.

A data log tailer 116 can be configured to access the sequential, row-oriented log file(s) 114 to retrieve input data logged by the data logging process. In some implementations, the data log tailer 116 can be configured to perform strict byte reading and transmission (e.g., to the data import server 120). The data import server 120 can be configured to store the input data into one or more corresponding data stores such as the periodic table data store 122 in a column-oriented configuration. The periodic table data store 122 can be used to store data that is being received within a time period (e.g., a minute, an hour, a day, etc.) and which may be later processed and stored in a data store of the long-term file server 108. For example, the periodic table data store 122 can include a plurality of data servers configured to store periodic securities trading data according to one or more characteristics of the data (e.g., a data value such as security symbol, the data source such as a given trading exchange, etc.).

The data import server 120 can be configured to receive and store data into the periodic table data store 122 in such a way as to provide a consistent data presentation to other parts of the system. Providing/ensuring consistent data in this context can include, for example, recording logged data to a disk or memory, ensuring rows presented externally are available for consistent reading (e.g., to help ensure that if the system has part of a record, the system has all of the record without any errors), and preserving the order of records from a given data source. If data is presented to clients, such as a remote query processor (132, 134), then the data may be persisted in some fashion (e.g., written to disk).

Figure 3A:
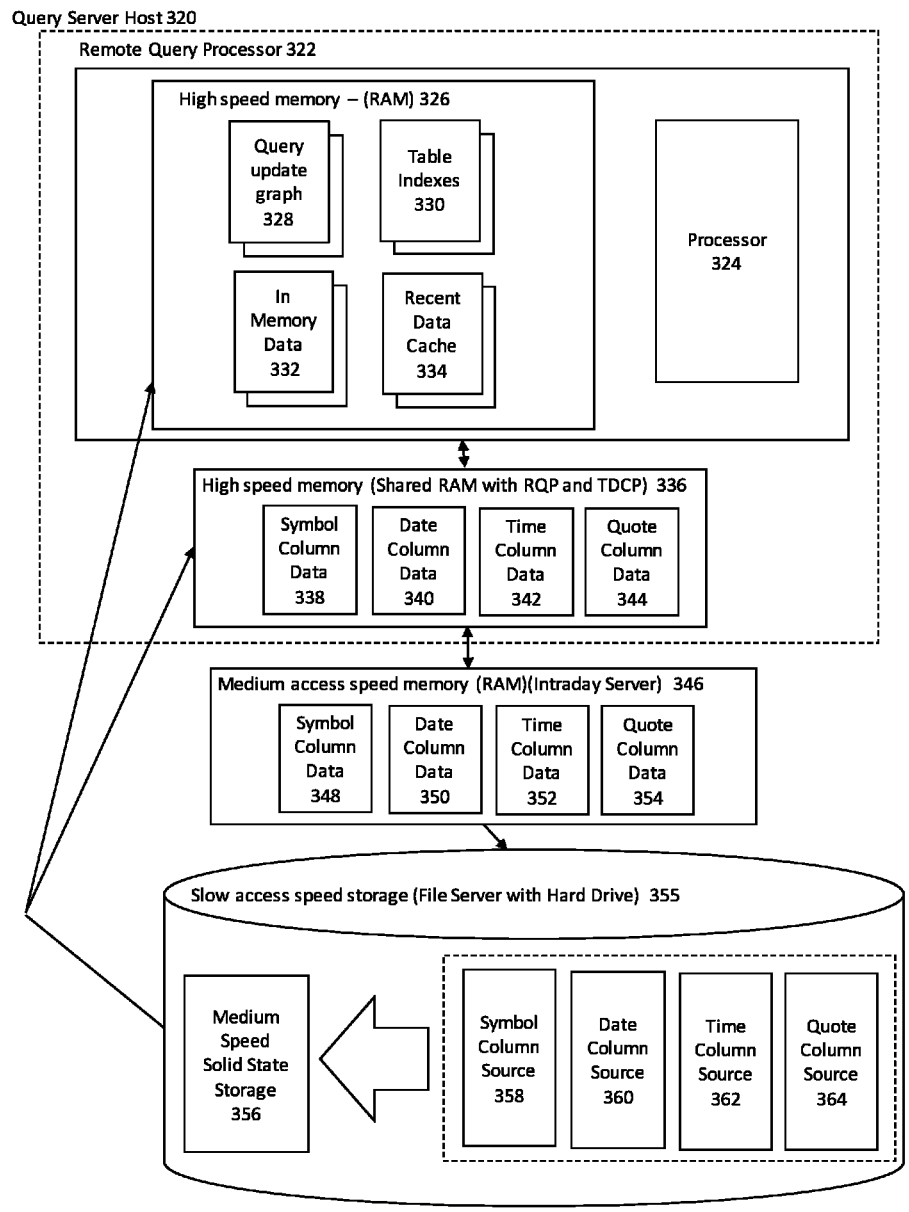
FIG. 3A is a diagram of an example query server host in accordance with some implementations.
Figure 3B:
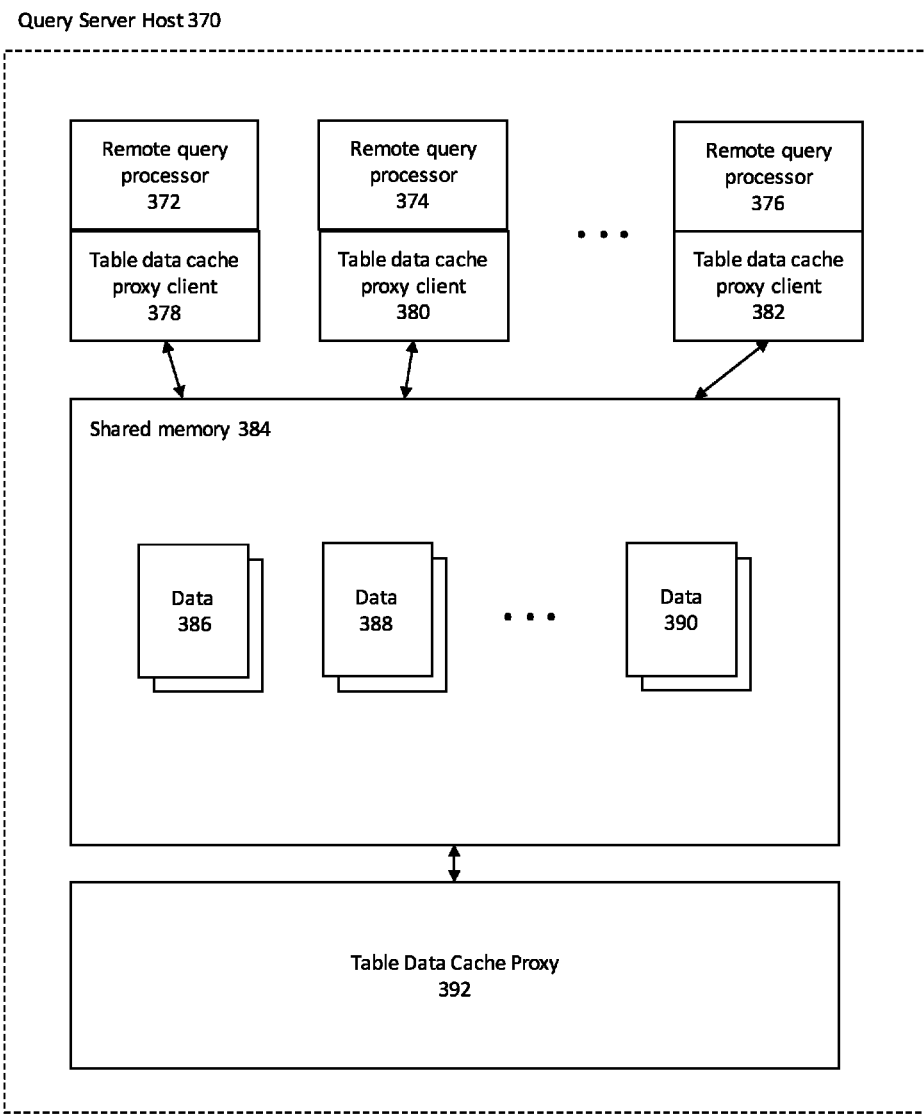
FIG. 3B is a diagram of an example query server host in accordance with some implementations.
Figure 4:
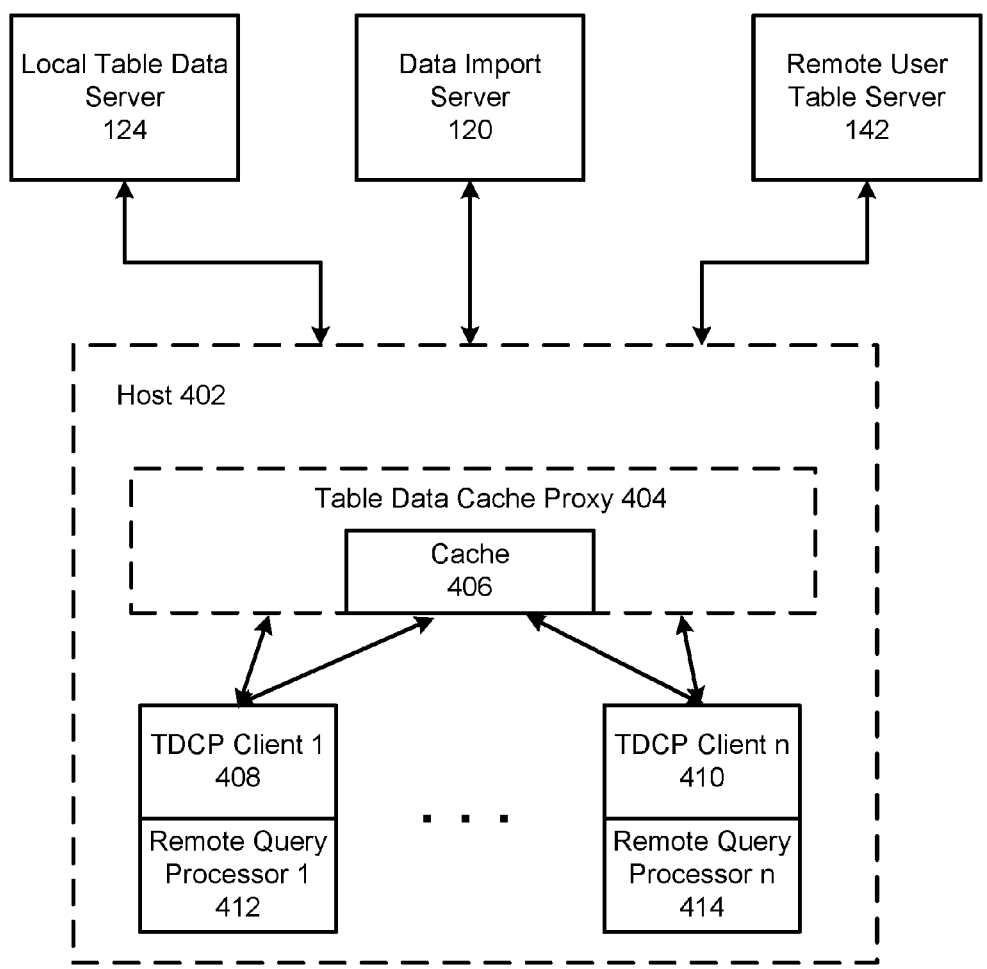
FIG. 4 is a diagram of an example computer data system and network 400 showing an example data distribution configuration in accordance with some implementations.

The local table data server 124 can be configured to retrieve data stored in the periodic table data store 122 and provide the retrieved data to one or more remote query processors (132, 134) via an optional proxy (e.g., table data cache proxy (TDCP) 394 and/or 404 as shown in FIG. 3 and FIG. 4, respectively). Remote query processors (132, 134) can also receive data from DIS 120 and/or LTDS 124 via the proxy.

The remote user table server (RUTS) 142 can include a centralized consistent data writer, as well as a data server that provides processors with consistent access to the data that it is responsible for managing. For example, users can provide input to the system by writing table data that is then consumed by query processors.

The remote query processors (132, 134) can use data from the data import server 120, local table data server 124 and/or from the long-term file server 108 to perform queries. The remote query processors (132, 134) can also receive data from the multicast key-value subscriber 126, which receives data from the multicast key-value publisher 118 in the application host 102. The performance table logger 128 can log performance information about each remote query processor and its respective queries into a local table data store 130. Further, the remote query processors can also read data from the RUTS, from local table data written by the performance logger, or from user table data read over NFS, for example.

It will be appreciated that the configuration shown in FIG. 1 is a typical example configuration that may be somewhat idealized for illustration purposes. An actual configuration may include one or more of each server and/or host type. The hosts/servers shown in FIG. 1 (e.g., 102-110, 120, 124 and 142) may each be separate or two or more servers may be combined into one or more combined server systems. Data stores can include local/remote, shared/isolated and/or redundant. Any table data may flow through optional proxies indicated by an asterisk on certain connections to the remote query processors (e.g., table data cache proxy (TDCP) 392 or 404 as shown in FIG. 3B and FIG. 4, respectively). Also, it will be appreciated that the term "periodic" is being used for illustration purposes and can include, but is not limited to, data that has been received within a given time period (e.g., millisecond, second, minute, hour, day, week, month, year, etc.) and which has not yet been stored to a long-term data store (e.g., 140).

FIG. 2 is a diagram of an example computer data system 200 showing an example administration/process control arrangement in accordance with some implementations. The system 200 includes a production client host 202, a controller host 204, a GUI host or workstation 206, and query server hosts 208 and 210. It will be appreciated that there may be one or more of each of 202-210 in a given implementation.

The production client host 202 can include a batch query application 212 (e.g., a query that is executed from a command line interface or the like) and a real time query data consumer process 214 (e.g., an application that connects to and listens to tables created from the execution of a separate query). The batch query application 212 and the real time query data consumer 214 can connect to a remote query dispatcher 222 and one or more remote query processors (224, 226) within the query server host 1 208.

The controller host 204 can include a persistent query controller 216 configured to connect to a remote query dispatcher 232 and one or more remote query processors 228-230. In some implementations, the persistent query controller 216 can serve as the "primary client" for persistent queries and can request remote query processors from dispatchers, and send instructions to start persistent queries. For example, a user can submit a query to 216, and 216 starts and runs the query every day. In another example, a securities trading strategy could be a persistent query. The persistent query controller can start the trading strategy query every morning before the market opened, for instance. It will be appreciated that 216 can work on times other than days. In some implementations, the controller may require its own clients to request that queries be started, stopped, etc. This can be done manually, or by scheduled (e.g., cron jobs). Some implementations can include "advanced scheduling" (e.g., auto-start/stop/restart, time-based repeat, etc.) within the controller.

The GUI/host workstation can include a user console 218 and a user query application 220. The user console 218 can be configured to connect to the persistent query controller 216. The user query application 220 can be configured to connect to one or more remote query dispatchers (e.g., 232) and one or more remote query processors (228, 230).

FIG. 3A is a diagram of an example query server host 320 (e.g., as described at 208, 210, and/or 106) in accordance with at least one embodiment. Query server host 320 can include a processor 324, a high speed memory (e.g., RAM)

326, another high speed memory (e.g., shared RAM with RQP and TDP) 336. Query server host 320 can access a medium access speed memory 346 (e.g., RAM managed by another host (actual or virtual) such as, for example, an intraday server (e.g., DIS 120 or LTDS 124)) and a slow access speed storage 355 (e.g., a file server with hard drive such as, for example, long term file server 108).

In operation, processor 324 can execute remote query processor 322 which stores/accesses data in high speed memory 326, high speed memory 336, medium access speed memory 346, and slow access speed storage 354. High speed memory 326 and high speed memory 336 can be memory on the same or different memory devices.

High speed memory 326 can contain one or more query update graphs 328, one or more table indexes 330, in memory data 332, and recent data cache 334. High speed memory 326 can request and retrieve data from one or more slow access speed storages 355 and/or from high speed memory 336.

High speed memory 336 can be memory that is shared with one or more remote query processors 322 and/or one or more table data cache proxies (e.g., TDCP 392 and 404, as shown in FIG. 3 and FIG. 4 respectively). High speed memory 336 can contain one or more data columns, for example, a symbol column data 338, a date column data 340, a time column data 342, and a quote column data 344. High speed memory 336 can exchange data with remote query processor 322, high speed memory 326, and/or medium access speed memory 346, and can request and receive data from slow access speed storage 355.

Medium access speed memory 346 can contain one or more data columns, for example, symbol column data 348, a date column data 350, a time column data 352, and a quote column data 354. Medium access speed memory 346 can exchange data with high speed memory 336 and can transmit data to a slow access speed storage 355. In some embodiments, medium access speed memory 346 is RAM that resides on a remote host, administered by a remote process (e.g., DIS 120, LTDS 124, or RUTS 142).

Slow access speed storage 355, for example, a file server with one or more hard drives, can contain persistent column data, for example, a symbol column 358, a date column 360, a time column 362, and a quote column 364. The one or more persisted column data 358-364 can be copied into medium speed solid state storage 356, for example, flash, to provide faster access for more frequently accessed data. In some embodiments, slow access speed storage 355 is used by long-term file server 108.

In some embodiments, remote query processor 322 can access a table having column data of two or more columns of the table stored in different memory devices and/or data servers. In some such embodiments, column data of a column (i.e., different rows or groups of rows) can also be stored in different memory devices and/or data servers. Processor 322 can store/access identifiers indicating where column data of the columns/rows is stored. Processor 322 can also store/access one or more table indexes associated with the table that identify for that table the valid portion(s) of the data referenced by the location identifier (e.g., the portions of the data which correspond to the rows of that table). For example, in some embodiments, a first portion of column data can be stored in shared memory with TDCP 336, a second portion of column data can be stored in medium speed memory 346, and a third portion of column data can be stored in slow speed storage 355, for the same or different columns of a table.

FIG. 3B is a diagram of an example query server host 370 (e.g., as described at 320, 208, 210, and/or 106) in accordance with at least one embodiment. Query server host 370 can contain one or more remote query processors (372, 374, 376) associated with one or more table data cache proxy clients (378, 380, 382), a shared memory 384 (e.g., as described at 336) that can exchange data (386, 388, 390) with table data cache proxy clients (378, 380, 382), and one or more table data cache proxies 392 that can exchange data with shared memory 384.

FIG. 4 is a diagram of an example computer data system and network 400 showing an example data distribution configuration in accordance with some implementations. System 400 includes local table data server (LTDS) 124, data import server (DIS) 120, remote user table server (RUTS) 142, and a host 402 (e.g., query server host 106, 208, 210, 320, and/or 370). Host 402 includes table data cache proxy (TDCP) 404, one or more remote query processors (RQP) 412/414, and one or more TDCP clients 408/410. TDCP includes a cache 406. In operation, each RQP 412/414 transmits data to and receives data from TDCP 404 via a corresponding one of TDCP clients 408/410, and TDCP 404 transmits data to and receives data from each of LTDS 124, DIS 120, and RUTS 142.

In some embodiments, TDCP 404 exports a composite table data service composed of multiple filtered remote table data services. In some embodiments, each of data sources 120, 124, and 142 exports a table data service via a messaging protocol and TDCP 404 is configured to export a composite table data service composed of the table data services of the data sources via a messaging protocol. The composite table data service of TDCP 404 can be composed of the services of data sources 120, 124, and 142 that are filtered and/or combined at a table-location level. A given "location" for a table may be provided by a single, non-composite service, but a client-visible table might be composed of locations from multiple underlying sources and the composite table data service of TDCP 404 provides data from the multiple underlying sources to a client (e.g., RQP 412/414 via TDCP clients 408/410), filtered and/or combined as appropriate.

In some embodiments, TDCP 404 is coupled to multiple of one or more of the different types of data sources 120, 124, and 142. In some such embodiments, the multiple data sources can provide the same data. The composite table data service of TDCP 404 can be configured to reconnect to any of the data sources that can provide the same data, and upon reconnection any in-progress requests are re-sent and any subscriptions are renewed.

In some embodiments, LTDS 124 provides access to un-merged real-time data from previous time periods (e.g., from the same storage systems to which current-period data is persisted by DIS 120). In some such embodiments, LTDS 124 can be used as a stop-gap (i.e., alternate data source) when issues prevent timely completion of the merge operations that transform, validate, and promote periodic data.

In some embodiments, the messaging protocol is identical for data sources 120, 124, and 142. In some such embodiments, the messaging protocol for TDCP 404 is identical to that of the data sources. In some embodiments, the messaging protocol of the data sources 120, 124, and 142 and/or the messaging protocol of TDCP 404 is built on top of one or more other networking protocols (e.g., TCP/IP).

In some embodiments, TDCP 404 is configured to serve as an aggregator of subscriptions by RQP 412/414 to the same metadata updates and/or requests for individual data and/or metadata items. TDCP 404 is configured to cache data and/or metadata received from data servers 120, 124, and 142 in cache 406.

In some embodiments, cache 406 comprises data blocks indexed by {{namespace, table name, table type}, {internal partition, column partition}, {column name, column file type, offset} } or, more generally, {table key}, {table location key}, {column block key}. Data blocks in cache 406 may be evicted (e.g., based on a modified LRU policy) at any time when they are not actively in-use. If more data becomes available (e.g., as implied by table size change notifications), the missing region of an already-cached data block can be read when a client requests the block in question. Successful data block read requests provide at least as much data as requested, but may provide more if the block has grown and the source can provide an additional suffix.

In some embodiments, cache 406 is indexed per-source. Each bottom-level table data service uses either the filesystem (which may be remote or local) or at most one actively-connected server, and maintains its own index of which location data it has. All caches within a given process generally share the same pool of free/managed data block memory-space, but this is configurable. The engine code deals with table locations, which have location-level metadata, per-column location-level metadata, and buffer stores associated with each relevant column file. The buffer store handles block indexing and presents the engine with byte-oriented access, which is then translated to cell-oriented access by an intermediate level of the engine code.

In embodiments, system 400 is configured such that TDCP 404 is authoritative for data stored in cache 406 from at least one of data sources 120, 124, and 142. Cache 406 includes data requested by the clients of TDCP 404, and different TDCPs with different attached clients/workloads will have different caches. Additionally, because of the underlying model for data updates used by data sources such as 120 and 124 in some embodiments (repeatable reads by virtue of append-only data changes, in the real-time system), if cache 406 has a data block from one of those data sources, it has the correct (i.e., authoritative) data for that data block. If it has a partial data block, the range that it has is correct data for that range. TDCP 404 therefore doesn't have to worry about having its data invalidated by upstream changes.

In some embodiments, connections between data sources 120, 124, and 142 and TDCP 404 are authenticated (e.g., using ACL permissions) and/or encrypted.

In some embodiments, TDCP 404 can communicate with TDCP clients 408-410 via an inter-process communication (IPC) mechanism (e.g., sockets, shared memory, memory mapped files, message passing, pipes, and/or message queues). For example, cache 406 can be stored in shared memory (e.g., shared memory 384 as shown in FIG. 3B). In some embodiments, the shared memory is System V IPC shared memory accessed with the various "shm_system" calls. In some embodiments, mixed IPC mechanisms may be used. For example, TDCP 404 can transmit data to one or more TDCP clients on a different host (actual or virtual) via one IPC mechanism (e.g., a socket/network) and provide data to one or more different TDCP clients via a different IPC mechanism (e.g., shared memory). In another example, TDCP 404 can communicate with data sources 120/124/142 using an IPC mechanism that is the same or different than that used for communications between TDCP 404 and TDCP clients 408-410.

Although not shown, in some embodiments, TDCP clients 408-410 and RQP 412-414 can be on a separate host (actual or virtual). In some such embodiments, data can be transmitted between TDCP 404 and TDCP clients 408-410 via a network.

In some embodiments, data may be transmitted between TDCP 404, data sources 120/124/142, TDCP clients 408-410, and RQP 412-414 using single and/or multipart messages.

In some embodiments, TDCP 404 and/or TDCP clients 408-410 maintain a separate cache (or a separate portion of the cache) for each RQP 412-414. In other embodiments, TDCP 404 and/or TDCP clients 408-410 can maintain separate and/or shared caches for RQP 412-414 (e.g., sharing a cache between two or more RQPs while maintaining a separate cache for a different RQP, or sharing one cache for all RQPs).

Figure 5:
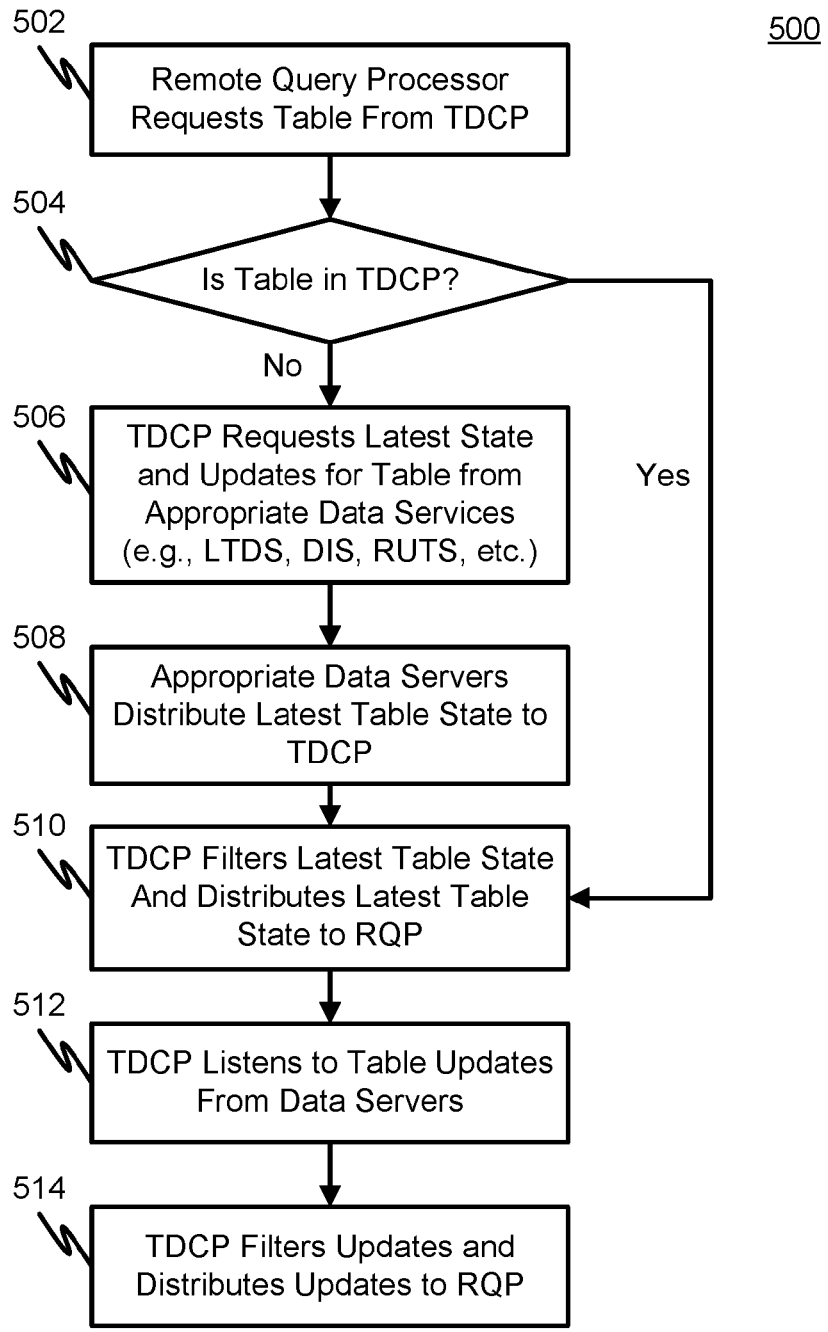
FIG. 5 is a flowchart of an example method of processing a TDCP composite table data service request in accordance with some implementations.

FIG. 5 is a flowchart of an example method 500 of processing a TDCP composite table data service request in accordance with some implementations. Processing begins at 502, where a remote query processor (RQP) (e.g., remote query processors 132-134, 322, 372-376, or 412-414 shown in FIG. 1, FIG. 3A, FIG. 3B, and FIG. 4, respectively) requests table (data and/or metadata) from a TDCP server (e.g., as shown in FIG. 3B or FIG. 4). Processing continues to 504.

At 504, the TDCP determines whether the requested table data/metadata is in the TDCP local state (or cache such as, for example, shared RAM 336, shared memory 384, or cache 406 shown in FIG. 3A, FIG. 3B, and FIG. 4, respectively). If so, processing continues to 510; otherwise, processing continues to 506.

At 506 the TDCP requests the latest state and subscribes to updates for the table from one or more appropriate data servers (e.g., LTDS 124, DIS 120, and/or RUTS 142 shown in FIG. 1 and FIG. 4). In some embodiments, the TDCP is coupled to multiple data servers (e.g., LTDS 124, DIS 120, and/or RUTS 142) and the TDCP selects one or more of the multiple data servers as the appropriate data servers for the request received at 502. In some embodiments, the one or more appropriate data servers can be selected based on a table type indicated in the request received at 502 (e.g., by determining which of the data servers match the table type and selecting those that match). In some embodiments, additional user tables can come from RUTS 142 and one more "user" filesystems mounted over NFS, performance log tables can be from locally-mounted filesystems, all of which may have independent services that can be composed by the TDCP and selected by the TDCP as one of the appropriate data servers.

At 508. the appropriate data servers distribute latest table state to the TDCP. The latest table state is received in response to the request(s) made by the TDCP at 506 and is stored in the TDCP cache. Processing continues to 510.

At 510, the TDCP filters/distributes the latest table state to the RQP. The latest table state can be filtered based on rules such as, for example, rules defining where data should come from (e.g., which data source is authoritative). Filtering can include removing metadata changes that aren't important to certain classes of downstream consumers (e.g., some TDCPs or RQPs might only want size changes, and/or might not want modifications after a certain time of day, and/or might not need to see all metadata fields). Additionally or alternatively, the TDCP can combine data related to two or more "downstream" table locations (with the same keys), and the filtering can include coalescing changes and only advertising them when (for example) a threshold (more than one, or all)

number of the data sources being combined had advertised the same thing, thereby increasing the likelihood that data can be re-read promptly in the event of a subset of the data sources crashing or becoming partitioned away.

In some embodiments, the TDCP can be configured to optimize the performance of computer data access when multiple data servers each provide access to the same data by requesting the latest table state from two or more of the multiple data servers at 506 and by filtering the received/cached table state to generate a complete, non-duplicative composite table state that includes data/metadata from two or more of the multiple data servers. In such embodiments, the table state can include table locations and the TDCP can filter table locations to be distributed to the RQP to interleave table locations from the multiple data servers, thereby distributing subsequent data access across the multiple data servers. Processing continues to 512.

At 512, the TDCP listens to table updates from the data servers. Listening to table updates can include listening to table updates from data servers to which the TDCP has subscribed for updates. Processing continues to 514.

At 514, the TDCP distributes updates to subscribing RQP. The TDCP can operate as an aggregator of subscriptions for multiple RQP and upon receiving an update the TDCP can distribute the update to the subscribing RQP. For example, although not shown, two different RQP can subscribe to the TDCP to receive updates. In some embodiments, the updates can be filtered as described above at 510 before being distributed to subscribing RQP.

It will be appreciated that, although not shown, the subscribing RQP can cancel their subscription to stop receiving updates from the TDCP, that all subscriptions are cancelled for an RQP that disconnects, and that the TDCP may cancel its own data subscriptions and/or discard data it no longer needs for any RQP.

It will also be appreciated that 502-514 may be repeated in whole or in part. For example, 512-514 may be repeated to continuously provide table location updates to the subscribing RQP.

Figure 6:
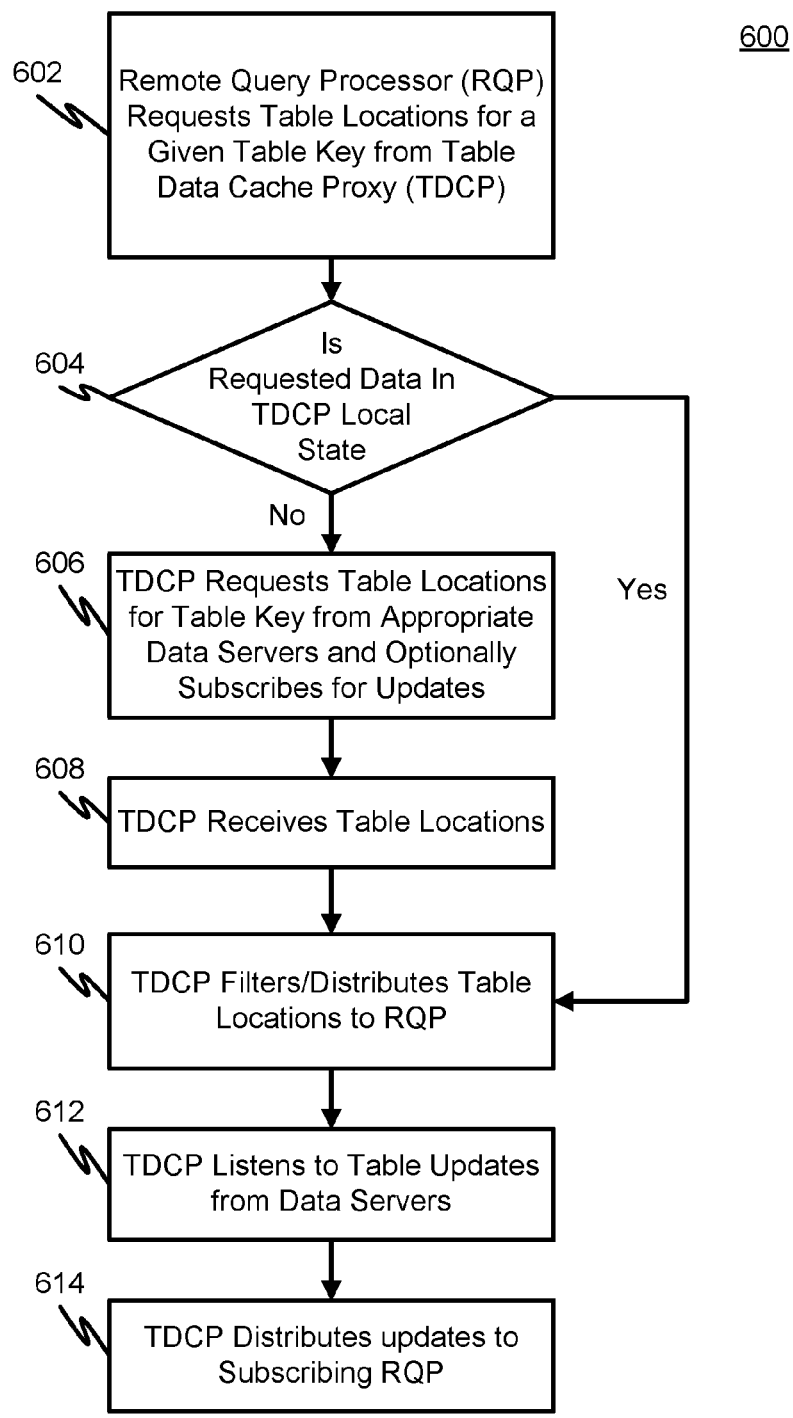
FIG. 6 is a flowchart of an example method of processing a table location discovery request by a TDCP server in accordance with some implementations.

FIG. 6 is a flowchart of an example method 600 of processing a table location discovery request by a TDCP server (e.g., as shown in FIG. 3B or FIG. 4) in accordance with some implementations. Processing begins at 602, where a remote query processor (RQP) (e.g., remote query processors 132-134, 322, 372-376, or 412-414 shown in FIG. 1, FIG. 3A, FIG. 3B, and FIG. 4, respectively) requests table locations for a given table key from the TDCP. The table key can comprise a namespace, a table name, and a table type (e.g. user/system, periodic/historical). In some embodiments, table locations are keyed by path information such as, for example, internal partition and column partition. Processing continues to 604.

At 604, the TDCP determines whether the requested data is in the TDCP local state (or cache such as, e.g., shared RAM 336, shared memory 384, or cache 406 shown in FIG. 3A, FIG. 3B, and FIG. 4, respectively). If so, processing continues to 610; otherwise, processing continues to 606.

At 606 the TDCP requests table locations for the given table key from one or more appropriate data servers (e.g., LTDS 124, DIS 120, and/or RUTS 142 shown in FIG. 1 and FIG. 4) and optionally subscribes for updates. In some embodiments, the TDCP is coupled to multiple data servers (e.g., LTDS 124, DIS 120, and/or RUTS 142) and the TDCP selects one or more of the multiple data servers as the appropriate data servers for the request received at 602. In some embodiments, the one or more appropriate data servers can be selected based on the table type indicated by the table key (e.g., by determining which of the data servers match the table type and selecting those that match).

At 608. the TDCP receives table locations. The table locations are received in response to the request(s) made by the TDCP at 606 and are stored in the TDCP cache. Processing continues to 610.

At 610, the TDCP filters/distributes the table locations to the RQP. The table locations can be filtered based on rules such as, for example, rules defining where data should come from (e.g., which data source is authoritative). In some embodiments, the TDCP can be configured to optimize the performance of computer data access when multiple data servers each provide access to the same data by requesting table locations from two or more of the multiple data servers at 606 and by filtering the received/cached table locations to generate a complete, non-duplicative set of table locations that includes locations from two or more of the multiple data servers. In such embodiments, the TDCP can, for example, filter the table locations to be distributed to the RQP to interleave table locations from the multiple data servers, thereby distributing subsequent data access across the multiple data servers.

Additionally or alternatively, the TDCP can combine data received from data servers that provide access to the same data (e.g., by combining different portions to generate a complete, non-duplicative set as discussed above, by combining all data, or by including data received from one of the data servers and excluding data received from the other data servers), and the filtering can include coalescing changes and only advertising them when (for example) a threshold (more than one, or all) number of the data sources being combined had advertised the same thing, thereby increasing the likelihood that data can be re-read promptly in the event of a subset of the data sources crashing or becoming partitioned away. Processing continues to 612.

At 612, the TDCP listens to table updates from the data servers. Listening to table updates can include listening to table updates from data servers to which the TDCP has subscribed for updates. Processing continues to 614.

At 614, the TDCP distributes updates to subscribing RQP. The TDCP can operate as an aggregator of subscriptions for multiple RQP and upon receiving an update the TDCP can distribute the update to the subscribing RQP. For example, although not shown, two different RQP can subscribe to the TDCP to receive updates to table locations. In some embodiments, the updates can be filtered as described above at 610 before being distributed to subscribing RQP.

It will be appreciated that, although not shown, the subscribing RQP can cancel their subscription to stop receiving updates from the TDCP, that all subscriptions are cancelled for an RQP that disconnects, and that the TDCP may cancel its own data subscriptions and/or discard data it no longer needs for any RQP.

It will also be appreciated that 602-614 may be repeated in whole or in part. For example, 612-614 may be repeated to continuously provide table location updates to the subscribing RQP.

Figure 7:
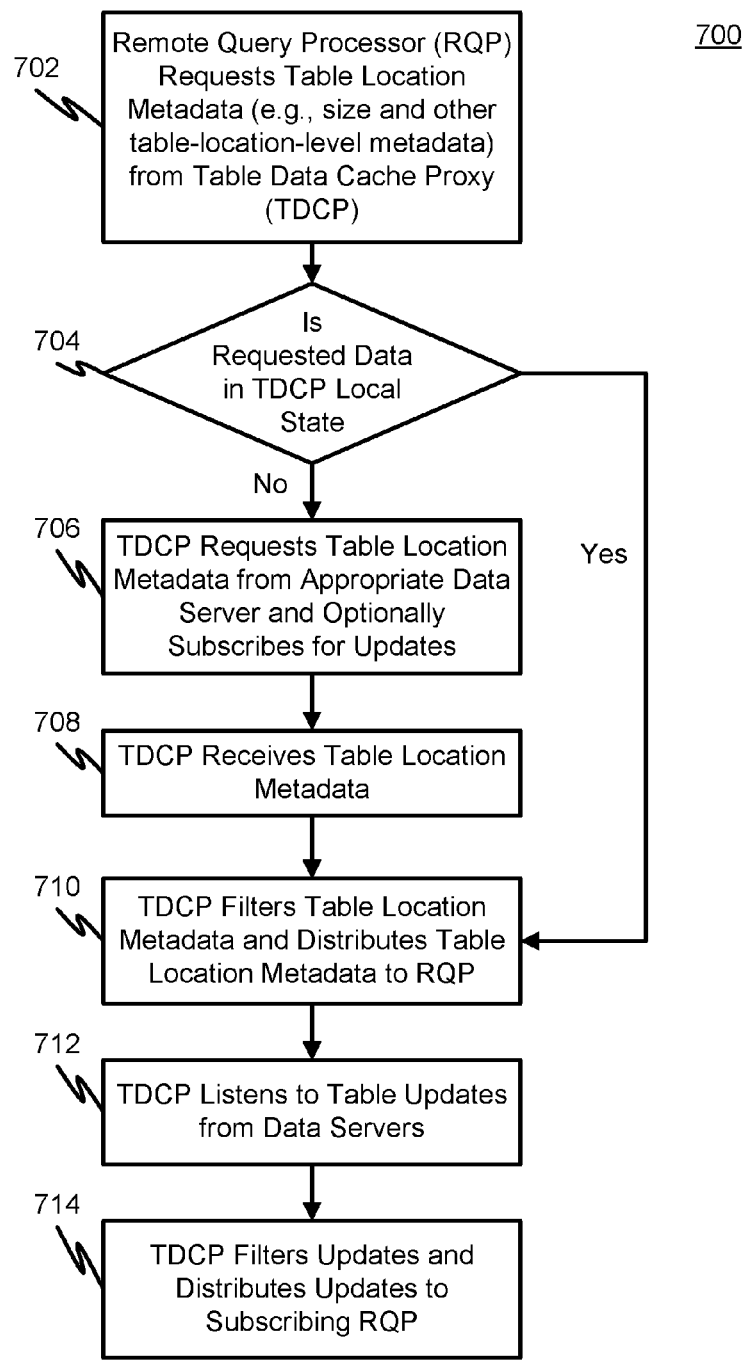
FIG. 7 is a flowchart of an example method of processing a table location metadata retrieval request by a TDCP server in accordance with some implementations.

FIG. 7 is a flowchart of an example method 700 of processing a table location metadata retrieval request by a TDCP server (e.g., as shown in FIG. 3B or FIG. 4) in accordance with some implementations. Processing begins at 702, where a remote query processor (RQP) (e.g., remote query processors 132-134, 322, 372-376, or 412-414 shown in FIG. 1, FIG. 3A, FIG. 3B, and FIG. 4, respectively) requests table location metadata for a given table from the TDCP. The table location metadata can comprise size, modification time, validation status and validation completion time (e.g., validation being a process of ensuring that the data has passed proper quality checks), schema version used to generate the data, code version used to generate the data, user identifying information, and other metadata. Table location metadata can also include an "is valid" flag or an "is finished" flag to indicate that the data has been validated (e.g., that the data has passed proper quality checks). Processing continues to 704.

At 704, the TDCP determines whether the requested table location metadata is in the TDCP local state (or cache such as, e.g., shared RAM 336, shared memory 384, or cache 406 shown in FIG. 3A, FIG. 3B, and FIG. 4, respectively). If so, processing continues to 710; otherwise, processing continues to 706.

At 706 the TDCP requests table location metadata from one or more appropriate data servers (e.g., LTDS 124, DIS 120, and/or RUTS 142 shown in FIG. 1 and FIG. 4) and subscribes for updates. In some embodiments, the TDCP is coupled to multiple data servers (e.g., LTDS 124, DIS 120, and/or RUTS 142) and the TDCP selects one or more of the multiple data servers as the appropriate data servers for the request received at 702. In some embodiments, the one or more appropriate data servers can be selected based on a table type and/or table location indicated in the request received at 702 (e.g., by determining which of the data servers match the table type and/or table location and selecting those that match).

At 708. the TDCP receives table location metadata. The table location metadata is received in response to the request(s) made by the TDCP at 706 and are stored in the TDCP cache. Processing continues to 710.

At 710, the TDCP filters/distributes the table location metadata to the RQP. The table location metadata can be filtered based on rules such as, for example, rules defining where data should come from (e.g., which data source is authoritative). Filtering can include removing metadata changes that aren't important to certain classes of downstream consumers (e.g., some TDCPs or RQPs might only want size changes, and/or might not want modifications after a certain time of day, and/or might not need to see all metadata fields). Additionally or alternatively, the TDCP can combine data related to two or more "downstream" table locations (with the same keys), and the filtering can include coalescing changes and only advertising them when (for example) a threshold (more than one, or all) number of data sources being combined had advertised the same thing, thereby increasing the likelihood that data can be re-read promptly in the event of a subset of the data sources crashing or becoming partitioned away. Processing continues to 712.

At 712, the TDCP listens to table updates from the data servers. Listening to table updates can include listening to table updates from data servers to which the TDCP has subscribed for updates. Processing continues to 714.

At 714, the TDCP distributes updates to subscribing RQP. The TDCP can operate as an aggregator of subscriptions for multiple RQP and upon receiving an update the TDCP can distribute the update to the subscribing RQP. For example, although not shown, two different RQP can subscribe to the TDCP to receive updates to table location metadata. In some embodiments, the updates can be filtered as described above at 710 before being distributed to subscribing RQP.

It will also be appreciated that, although not shown, the subscribing RQP can cancel their subscription to stop receiving updates from the TDCP, that all subscriptions are cancelled for an RQP that disconnects, and that the TDCP may cancel its own data subscriptions and/or discard data it no longer needs for any RQP.

It will also be appreciated that 702-714 may be repeated in whole or in part. For example, 712-714 may be repeated to continuously provide table location metadata updates to the subscribing RQP (e.g. sending updates to table size as it changes).

Figure 8:
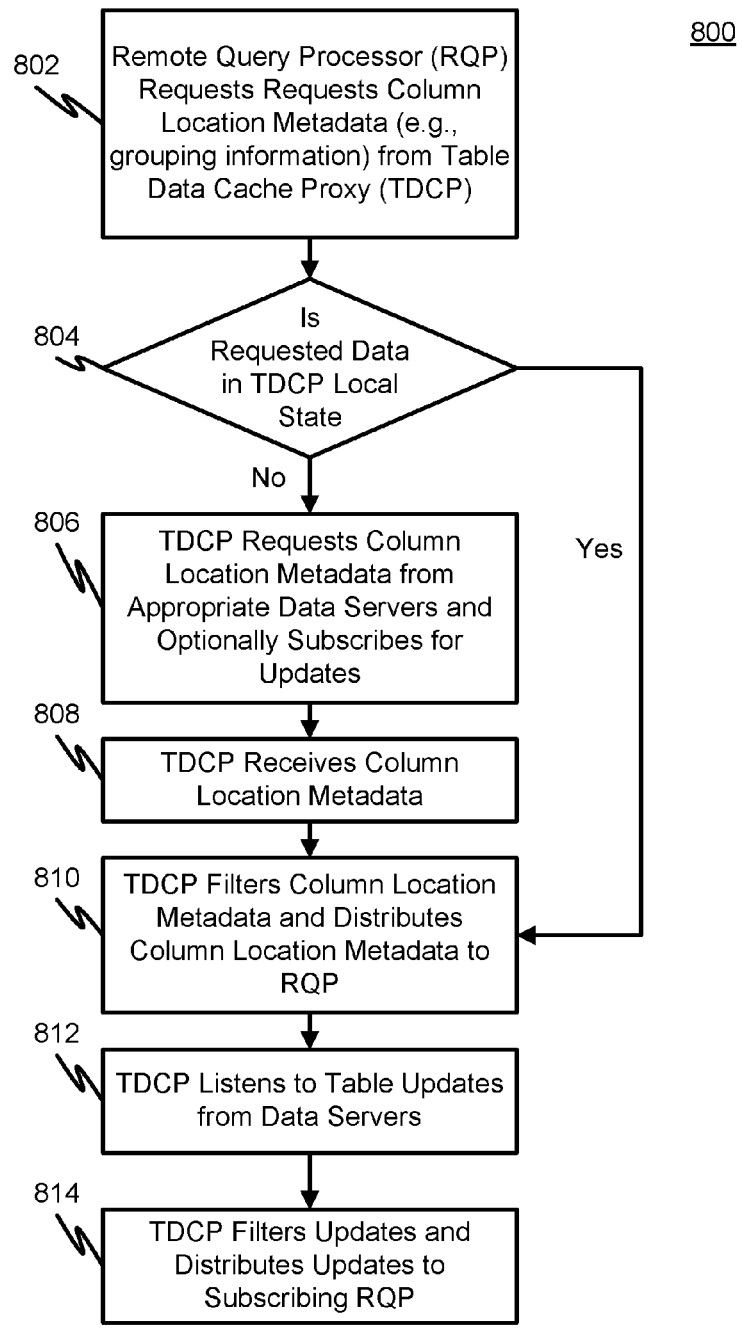
FIG. 8 is a flowchart of an example method of processing a column location metadata retrieval request by a TDCP server in accordance with some implementations.

FIG. 8 is a flowchart of an example method 800 of processing a column location metadata retrieval request by a TDCP server (e.g., as shown in FIG. 3B or FIG. 4) in accordance with some implementations. Processing begins at 802, where a remote query processor (RQP) (e.g., remote query processors 132-134, 322, 372-376, or 412-414 shown in FIG. 1, FIG. 3A, FIG. 3B, and FIG. 4, respectively) requests column location metadata (e.g., grouping information, periodic/historical). Processing continues to 804.

At 804, the TDCP determines whether the requested column location metadata is in the TDCP local state (or cache such as, e.g., shared RAM 336, shared memory 384, or cache 406 shown in FIG. 3A, FIG. 3B, and FIG. 4, respectively). If so, processing continues to 810; otherwise, processing continues to 806.

At 806 the TDCP requests column location metadata from one or more appropriate data servers (e.g., LTDS 124, DIS 120, and/or RUTS 142 shown in FIG. 1 and FIG. 4) and optionally subscribes for updates. For example, a subscriber could subscribe to receive updates to value indexes included in column metadata (e.g., for real-time/periodic/intraday data). In some embodiments, the TDCP is coupled to multiple data servers (e.g., LTDS 124, DIS 120, and/or RUTS 142) and the TDCP selects one or more of the multiple data servers as the appropriate data servers for the request received at 802. In some embodiments, the one or more appropriate data servers can be selected based on the table type indicated by a table type and/or table location indicated in the request received at 802 (e.g., by determining which of the data servers match the table type and/or table location and selecting those that match).

At 808. the TDCP receives column location metadata. The column location metadata is received in response to the request(s) made by the TDCP at 806 and are stored in the TDCP cache. Processing continues to 810.

At 810, the TDCP filters/distributes the column location metadata to the RQP. The column location metadata can be filtered based on rules such as, for example, rules defining where data should come from (e.g., which data source is authoritative). Column location metadata can also be filtered to eliminate updates of a nature not needed/requested by certain downstream consumers (e.g., grouping/indexing changes if the RQP/query doesn't use them). In some embodiments, filtering at 810 can include removing metadata changes that aren't important to certain classes of downstream consumers (e.g., some TDCPs or RQPs might only want size changes, and/or might not want modifications after a certain time of day, and/or might not need to see all metadata fields). Additionally or alternatively, the TDCP can combine data related to two or more "downstream" table locations (with the same keys), and filtering at 810 can include coalescing changes and only advertising them when (for example) a threshold (more than one, or all) number of the data sources being combined had advertised the same thing, thereby increasing the likelihood that data can be re-read promptly in the event of a subset of the data sources crashing or becoming partitioned away. Processing continues to 812.

At 812, the TDCP listens to table updates from the data servers. Listening to table updates can include listening to table updates from data servers to which the TDCP has subscribed for updates. Processing continues to 814.

At 814, the TDCP distributes updates to subscribing RQP. The TDCP can operate as an aggregator of subscriptions for multiple RQP and upon receiving an update the TDCP can distribute the update to the subscribing RQP. For example, although not shown, two different RQP can subscribe to the TDCP to receive updates to column location metadata. In some embodiments, the updates can be filtered as described above at 810 before being distributed to subscribing RQP.

It will be appreciated that, although not shown, the subscribing RQP can cancel their subscription to stop receiving updates from the TDCP, that all subscriptions are cancelled for an RQP that disconnects, and that the TDCP may cancel its own data subscriptions and/or discard data it no longer needs for any RQP.

It will also be appreciated that 802-814 may be repeated in whole or in part. For example, 812-814 may be repeated to continuously provide column location metadata updates to the subscribing RQP (e.g. sending updated column size as it changes)

Figure 9:
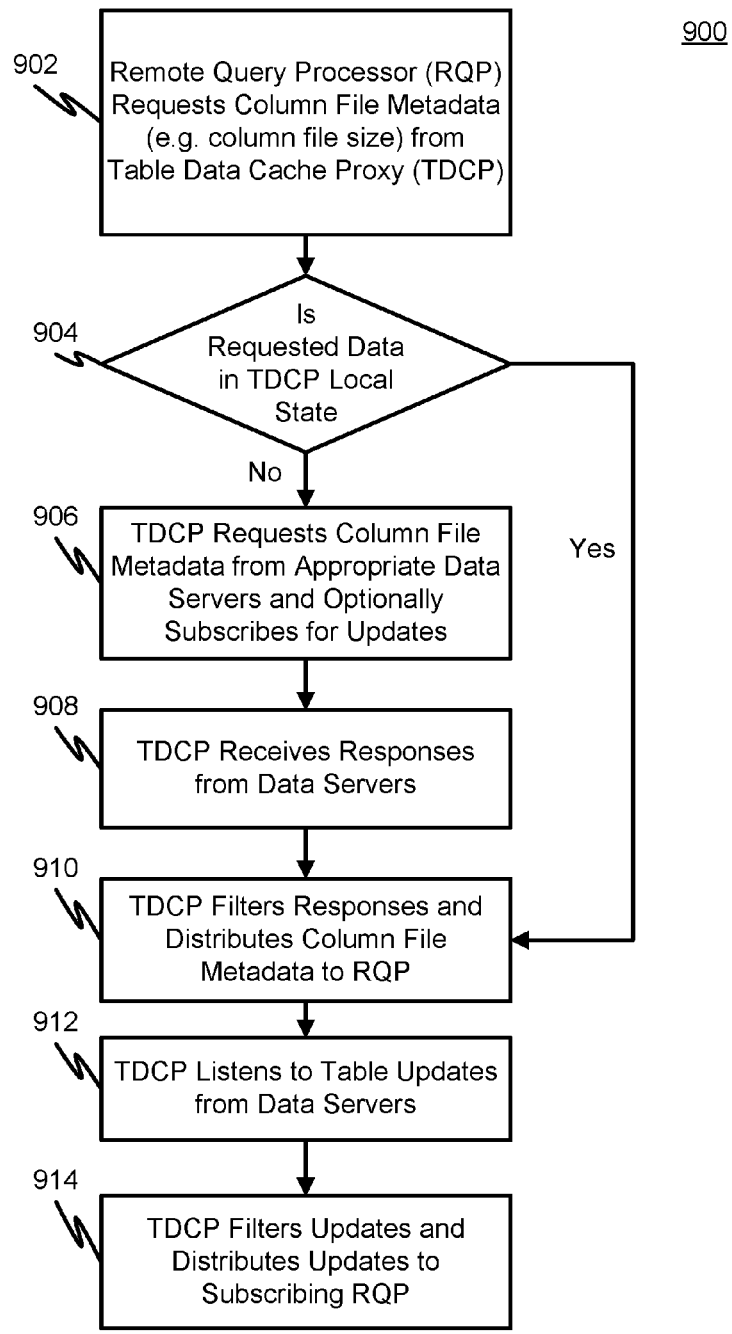
FIG. 9 is a flowchart of an example method of processing a column file size retrieval request by a TDCP server in accordance with some implementations.

FIG. 9 is a flowchart of an example method 900 of processing a column file metadata retrieval request by a TDCP server (e.g., as shown in FIG. 3B or FIG. 4) in accordance with some implementations. Processing begins at 902, where a remote query processor (RQP) (e.g., remote query processors 132-134, 322, 372-376, or 412-414 shown in FIG. 1, FIG. 3A, FIG. 3B, and FIG. 4, respectively) requests column file metadata which can include column file size (e.g., for column files that aren't an exact multiple of table location size) from the TDCP. Processing continues to 904.

At 904, the TDCP determines whether the requested column file metadata is in the TDCP local state (or cache such as, e.g., shared RAM 336, shared memory 384, or cache 406 shown in FIG. 3A, FIG. 3B, and FIG. 4, respectively). If so, processing continues to 910; otherwise, processing continues to 906.

At 906 the TDCP requests column file metadata from one or more appropriate data servers (e.g., LTDS 124, DIS 120, and/or RUTS 142 shown in FIG. 1 and FIG. 4) and optionally subscribes for updates. In some embodiments, the TDCP is coupled to multiple data servers (e.g., LTDS 124, DIS 120, and/or RUTS 142) and the TDCP selects one or more of the multiple data servers as the appropriate data servers for the request received at 902. In some embodiments, the one or more appropriate data servers can be selected based on a column and/or column location/file indicated in the request received at 902 (e.g., by determining which of the data servers match the column and/or column location/file).

At 908, the TDCP receives column file metadata. The column file metadata is received in response to the request(s) made by the TDCP at 906 and are stored in the TDCP cache. Processing continues to 910.

At 910, the TDCP filters/distributes the column file metadata to the RQP. The column file metadata can be filtered based on rules such as, for example, rules defining where data should come from (e.g., which data source is authoritative). Column file metadata can be filtered, for example, to throttle the rate of change notification to the same frequency as other notifications such as table metadata (e.g., size) change notifications. Column file metadata can also be filtered to eliminate updates of a nature not needed/requested by certain downstream consumers. In some embodiments, filtering at 910 can include removing metadata changes that aren't important to certain classes of downstream consumers (e.g., some TDCPs or RQPs might not want modifications after a certain time of day, and/or might not need to see all metadata fields). Additionally or alternatively, the TDCP can combine data related to two or more "downstream" table locations (with the same keys), and filtering at 910 can include coalescing changes and only advertising them when (for example) a threshold (more than one, or all) number of the data sources being combined had advertised the same thing, thereby increasing the likelihood that data can be re-read promptly in the event of a subset of the data sources crashing or becoming partitioned away. Processing continues to 912.

At 912, the TDCP listens to table updates from the data servers. Listening to table updates can include listening to table updates from data servers to which the TDCP has subscribed for updates. Processing continues to 914.

At 914, the TDCP distributes updates to subscribing RQP. The TDCP can operate as an aggregator of subscriptions for multiple RQP and upon receiving an update the TDCP can distribute the update to the subscribing RQP. For example, although not shown, two different RQP can subscribe to the TDCP to receive updates to column file metadata. In some embodiments, the updates can be filtered as described above at 910 before being distributed to subscribing RQP.

It will be appreciated that, although not shown, the subscribing RQP can cancel their subscription to stop receiving updates from the TDCP, that all subscriptions are cancelled for an RQP that disconnects, and that the TDCP may cancel its own data subscriptions and/or discard data it no longer needs for any RQP.

It will also be appreciated that 902-914 may be repeated in whole or in part. For example, 912-914 may be repeated to continuously provide column file size updates to the subscribing RQP (e.g. sending updated column size as it changes).

Figure 10:
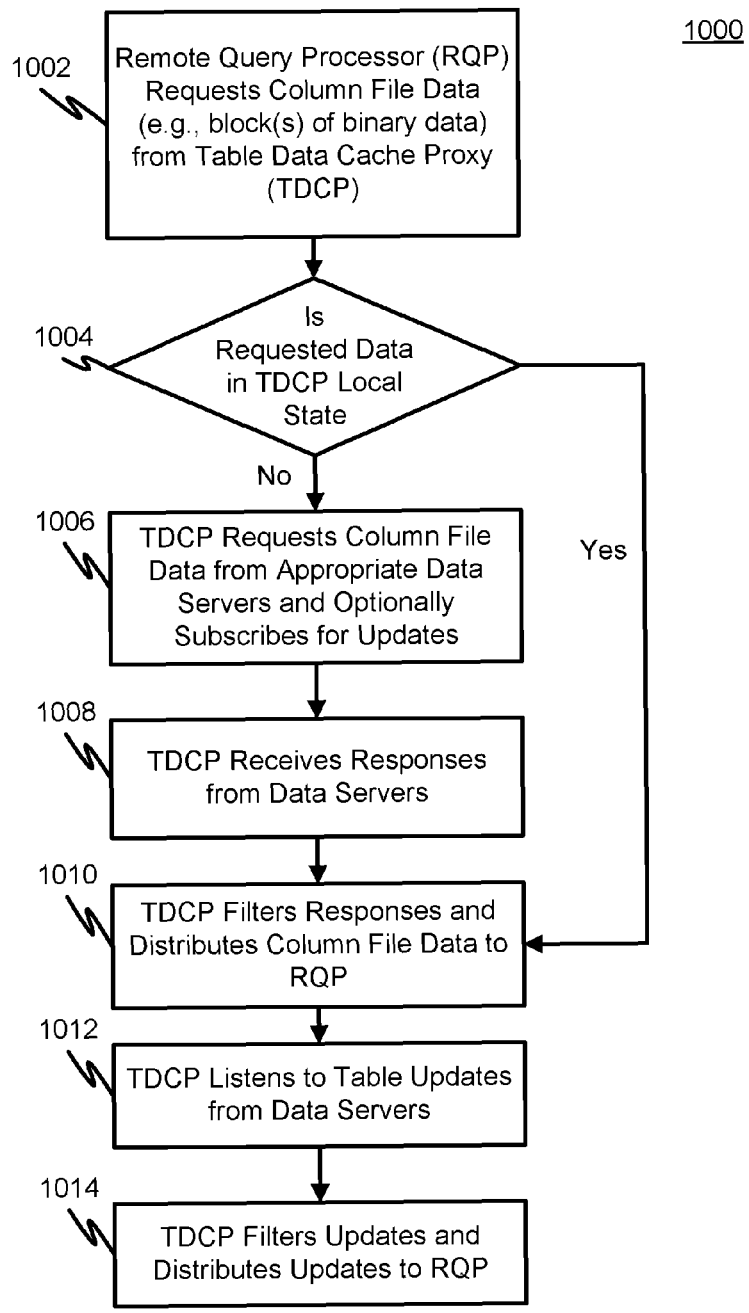
FIG. 10 is a flowchart of an example method of processing a column file data retrieval request by a TDCP server in accordance with some implementations.

FIG. 10 is a flowchart of an example method 1000 of processing a column file data retrieval request by a TDCP server (e.g., as shown in FIG. 3B or FIG. 4) in accordance with some implementations. Processing begins at 1002, where a remote query processor (RQP) (e.g., remote query processors 132-134, 322, 372-376, or 412-414 shown in FIG. 1, FIG. 3A, FIG. 3B, and FIG. 4, respectively) requests column file data from the TDCP. The client, and each intermediating service that cannot satisfy the request out of cache, requests the data for a block of binary data. The request includes the block size (which may be standardized at the service level), starting offset of the block within the column file, starting offset desired within the block, and minimum result length. More data (e.g., up to the maximum result length=block size−starting offset within the block) may be retrieved if available to prevent redundant subsequent requests. Processing continues to 1004.

At 1004, the TDCP determines whether the column file data is in the TDCP local state (or cache such as, e.g., shared RAM 336, shared memory 384, or cache 406 shown in FIG. 3A, FIG. 3B, and FIG. 4, respectively). If so, processing continues to 1010; otherwise, processing continues to 1006.

At 1006 the TDCP requests column file data from one or more appropriate data servers (e.g., LTDS 124, DIS 120, and/or RUTS 142 shown in FIG. 1 and FIG. 4) and optionally subscribes for updates. In some embodiments, the TDCP is coupled to multiple data servers (e.g., LTDS 124, DIS 120, and/or RUTS 142) and the TDCP selects one or more of the multiple data servers as the appropriate data servers for the request received at 1002. In some embodiments, the one or more appropriate data servers can be selected based on the column file and/or the type of table that the column is a part of (e.g., by determining which of the data servers match the table type and selecting those that match). In some embodiments, when the TDCP has only a portion of the requested data in cache the TDCP can request whatever sub-range it doesn't have, and each request might actually get more data than they asked for in order to amortize away subsequent requests.

At 1008. the TDCP receives column file data. The column file data is received in response to the request(s) made by the TDCP at 1006 and are stored in the TDCP cache. Processing continues to 1010.

At 1010, the TDCP filters responses and/or distributes the column file data to the RQP. The column file data can be filtered based on rules such as, for example, rules defining where data should come from (e.g., which data source is authoritative when the data was requested from two or more sources). In some embodiments, the TDCP can be configured to optimize the performance of computer data access when multiple data servers each provide access to the same data by requesting different portions of the requested column file data from two or more of the multiple data servers at 606 and by filtering the responses to combine the different portions of column file data received from the multiple data servers into the column file data to be distributed to the RQP. In such embodiments, the TDCP can, for example, split the request across the multiple data servers, thereby distributing data access across the multiple data servers. In some embodiments, the TDCP or RQP may determine that requests for column file data follow a pattern (e.g., sequential access, striding, etc.) and prefetch one or more additional blocks or ranges of column file data from the appropriate data sources in order to enhance system performance by decreasing perceived latency and/or amortizing request costs. Processing continues to 1012.

At 1012, the TDCP listens to table updates from the data servers. Listening to table updates can include listening to table updates from data servers to which the TDCP has subscribed for updates. Processing continues to 1014.

At 1014, the TDCP distributes updates to subscribing RQP. The TDCP can operate as an aggregator of subscriptions for multiple RQP and upon receiving an update the TDCP can distribute the update to the subscribing RQP. For example, although not shown, two different RQP can subscribe to the TDCP to receive updates. In some embodiments, the updates can be filtered as described above at 1010 before being distributed to subscribing RQP.

It will be appreciated that, although not shown, the subscribing RQP can cancel their subscription to stop receiving updates from the TDCP, that all subscriptions are cancelled for an RQP that disconnects, and that the TDCP may cancel its own data subscriptions and/or discard data it no longer needs for any RQP.

It will also be appreciated that 1002-1014 may be repeated in whole or in part. For example, 1012-1014 may be repeated to continuously provide table location updates to the subscribing RQP.

Figure 11:
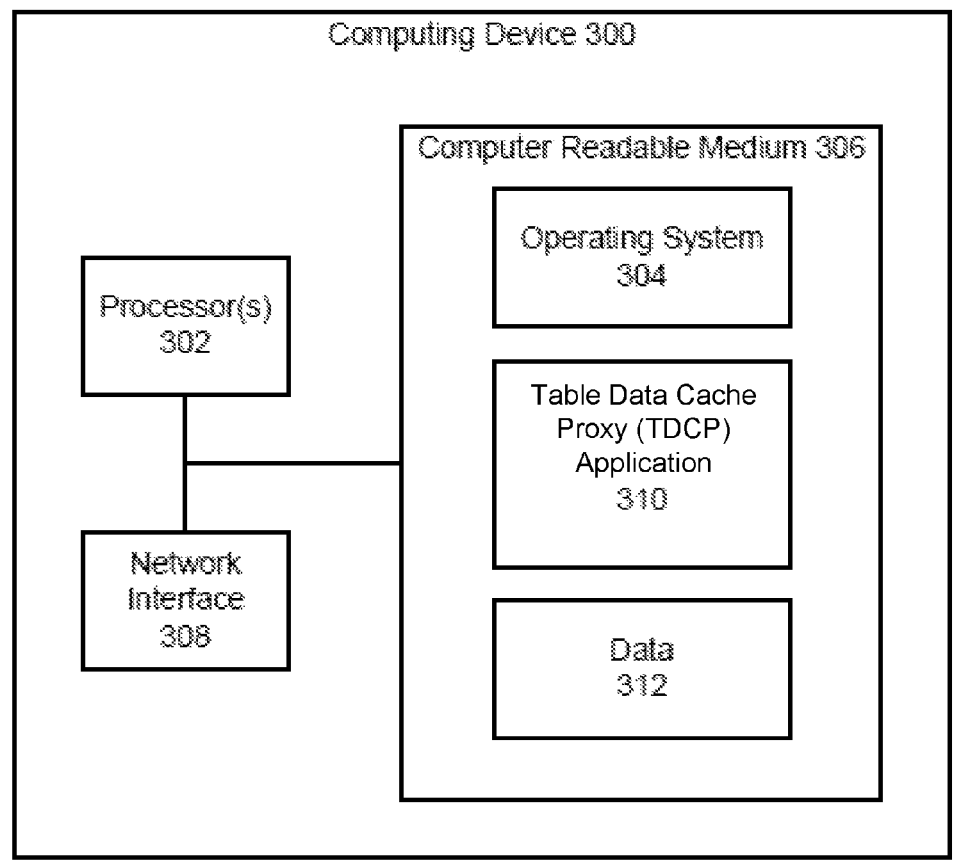
FIG. 11 is a diagram of an example computing device configured for table data cache proxy (TDCP) processing in accordance with at least one implementation.

FIG. 11 is a diagram of an example computing device 300 configured for table data cache proxy (TDCP) processing in accordance with at least one implementation. The computing device 300 includes one or more processors 302, operating system 304, computer readable medium 306 and network interface 308. The memory 306 can include table data cache proxy (TDCP) application 310 and a data section 312 (e.g., for storing caches, index data structures, column source maps, etc.).

In operation, the processor 302 may execute the application 310 stored in the memory 306. The application 310 can include software instructions that, when executed by the processor, cause the processor to perform operations for table data cache proxy processing in accordance with the present disclosure (e.g., performing one or more of 502-514, 602-614, 702-714, 802-814, 902-914, and/or 1002-1014 described above).

The application program 310 can operate in conjunction with the data section 312 and the operating system 304.

Although references have been made herein to tables and table data, it will be appreciated that the disclosed systems and methods can be applied with various computer data objects to, for example, provide flexible data routing and caching for such objects in accordance with the disclosed subject matter. For example, references herein to tables can include a collection of objects generally, and tables can include column types that are not limited to scalar values and can include complex types (e.g., objects).

It will be appreciated that the modules, processes, systems, and sections described above can be implemented in hardware, hardware programmed by software, software instructions stored on a nontransitory computer readable medium or a combination of the above. A system as described above, for example, can include a processor configured to execute a sequence of programmed instructions stored on a nontransitory computer readable medium. For example, the processor can include, but not be limited to, a personal computer or workstation or other such computing system that includes a processor, microprocessor, microcontroller device, or is comprised of control logic including integrated circuits such as, for example, an Application Specific Integrated Circuit (ASIC), a field programmable gate array (FPGA), a graphics processing unit (e.g., GPGPU or GPU) or the like. The instructions can be compiled from source code instructions provided in accordance with a programming language such as Java, C, C++, C#.net, assembly or the like. The instructions can also comprise code and data objects provided in accordance with, for example, the Visual Basic™ language, a specialized database query language, or another structured or object-oriented programming language. The sequence of programmed instructions, or programmable logic device configuration software, and data associated therewith can be stored in a nontransitory computer-readable medium such as a computer memory or storage device which may be any suitable memory apparatus, such as, but not limited to ROM, PROM, EEPROM, RAM, flash memory, disk drive and the like.

Furthermore, the modules, processes systems, and sections can be implemented as a single processor or as a distributed processor. Further, it should be appreciated that the steps mentioned above may be performed on a single or distributed processor (single and/or multi-core, or cloud computing system). Also, the processes, system components, modules, and sub-modules described in the various figures of and for embodiments above may be distributed across multiple computers or systems or may be co-located in a single processor or system. Example structural embodiment alternatives suitable for implementing the modules, sections, systems, means, or processes described herein are provided below.

The modules, processors or systems described above can be implemented as a programmed general purpose computer, an electronic device programmed with microcode, a hard-wired analog logic circuit, software stored on a computer-readable medium or signal, an optical computing device, a networked system of electronic and/or optical devices, a special purpose computing device, an integrated circuit device, a semiconductor chip, and/or a software module or object stored on a computer-readable medium or signal, for example.

Embodiments of the method and system (or their subcomponents or modules), may be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic circuit such as a PLD, PLA, FPGA, PAL, GP, GPU, or the like. In general, any processor capable of implementing the functions or steps described herein can be used to implement embodiments of the method, system, or a computer program product (software program stored on a nontransitory computer readable medium).

Furthermore, embodiments of the disclosed method, system, and computer program product (or software instructions stored on a nontransitory computer readable medium) may be readily implemented, fully or partially, in software using, for example, object or object-oriented software development environments that provide portable source code that can be used on a variety of computer platforms. Alternatively, embodiments of the disclosed method, system, and computer program product can be implemented partially or fully in hardware using, for example, standard logic circuits or a VLSI design. Other hardware or software can be used to implement embodiments depending on the speed and/or efficiency requirements of the systems, the particular function, and/or particular software or hardware system, microprocessor, or microcomputer being utilized. Embodiments of the method, system, and computer program product can be implemented in hardware and/or software using any known or later developed systems or structures, devices and/or software by those of ordinary skill in the applicable art from the function description provided herein and with a general basic knowledge of the software engineering and computer networking arts.

Moreover, embodiments of the disclosed method, system, and computer readable media (or computer program product) can be implemented in software executed on a programmed general purpose computer, a special purpose computer, a microprocessor, or the like.

It is, therefore, apparent that there is provided, in accordance with the various embodiments disclosed herein, methods, systems and computer readable media for computer data distribution architecture.

Application Ser. No. 15/154,974, entitled "DATA PARTITIONING AND ORDERING" and filed in the United States Patent and Trademark Office on May 14, 2016, is hereby incorporated by reference herein in its entirety as if fully set forth herein.

Application Ser. No. 15/154,975, entitled "COMPUTER DATA SYSTEM DATA SOURCE REFRESHING USING AN UPDATE PROPAGATION GRAPH" and filed in the United States Patent and Trademark Office on May 14, 2016, is hereby incorporated by reference herein in its entirety as if fully set forth herein.

Application Ser. No. 15/154,979, entitled "COMPUTER DATA SYSTEM POSITION-INDEX MAPPING" and filed in the United States Patent and Trademark Office on May 14, 2016, is hereby incorporated by reference herein in its entirety as if fully set forth herein.

Application Ser. No. 15/154,980, entitled "SYSTEM PERFORMANCE LOGGING OF COMPLEX REMOTE QUERY PROCESSOR QUERY OPERATIONS" and filed in the United States Patent and Trademark Office on May 14, 2016, is hereby incorporated by reference herein in its entirety as if fully set forth herein.

Application Ser. No. 15/154,983, entitled "DISTRIBUTED AND OPTIMIZED GARBAGE COLLECTION OF REMOTE AND EXPORTED TABLE HANDLE LINKS TO UPDATE PROPAGATION GRAPH NODES" and filed in the United States Patent and Trademark Office on May 14, 2016, is hereby incorporated by reference herein in its entirety as if fully set forth herein.

Application Ser. No. 15/154,984, entitled "COMPUTER DATA SYSTEM CURRENT ROW POSITION QUERY LANGUAGE CONSTRUCT AND ARRAY PROCESSING QUERY LANGUAGE CONSTRUCTS" and filed in the United States Patent and Trademark Office on May 14, 2016, is hereby incorporated by reference herein in its entirety as if fully set forth herein.

Application Ser. No. 15/154,985, entitled "PARSING AND COMPILING DATA SYSTEM QUERIES" and filed in the United States Patent and Trademark Office on May 14, 2016, is hereby incorporated by reference herein in its entirety as if fully set forth herein.

Application Ser. No. 15/154,987, entitled "DYNAMIC FILTER PROCESSING" and filed in the United States Patent and Trademark Office on May 14, 2016, is hereby incorporated by reference herein in its entirety as if fully set forth herein.

Application Ser. No. 15/154,988, entitled "DYNAMIC JOIN PROCESSING USING REAL-TIME MERGED NOTIFICATION LISTENER" and filed in the United States Patent and Trademark Office on May 14, 2016, is hereby incorporated by reference herein in its entirety as if fully set forth herein.

Application Ser. No. 15/154,990, entitled "DYNAMIC TABLE INDEX MAPPING" and filed in the United States Patent and Trademark Office on May 14, 2016, is hereby incorporated by reference herein in its entirety as if fully set forth herein.

Application Ser. No. 15/154,991, entitled "QUERY TASK PROCESSING BASED ON MEMORY ALLOCATION AND PERFORMANCE CRITERIA" and filed in the United States Patent and Trademark Office on May 14, 2016, is hereby incorporated by reference herein in its entirety as if fully set forth herein.

Application Ser. No. 15/154,993, entitled "A MEMORY-EFFICIENT COMPUTER SYSTEM FOR DYNAMIC UPDATING OF JOIN PROCESSING" and filed in the United States Patent and Trademark Office on May 14, 2016, is hereby incorporated by reference herein in its entirety as if fully set forth herein.

Application Ser. No. 15/154,995, entitled "QUERY DISPATCH AND EXECUTION ARCHITECTURE" and filed in the United States Patent and Trademark Office on May 14, 2016, is hereby incorporated by reference herein in its entirety as if fully set forth herein.

Application Ser. No. 15/154,996, entitled "COMPUTER DATA DISTRIBUTION ARCHITECTURE" and filed in the United States Patent and Trademark Office on May 14, 2016, is hereby incorporated by reference herein in its entirety as if fully set forth herein.

Application Ser. No. 15/154,997, entitled "DYNAMIC UPDATING OF QUERY RESULT DISPLAYS" and filed in the United States Patent and Trademark Office on May 14, 2016, is hereby incorporated by reference herein in its entirety as if fully set forth herein.

Application Ser. No. 15/154,998, entitled "DYNAMIC CODE LOADING" and filed in the United States Patent and Trademark Office on May 14, 2016, is hereby incorporated by reference herein in its entirety as if fully set forth herein.

Application Ser. No. 15/154,999, entitled "IMPORTATION, PRESENTATION, AND PERSISTENT STORAGE OF DATA" and filed in the United States Patent and Trademark Office on May 14, 2016, is hereby incorporated by reference herein in its entirety as if fully set forth herein.

Application Ser. No. 15/155,001, entitled "COMPUTER DATA DISTRIBUTION ARCHITECTURE" and filed in the United States Patent and Trademark Office on May 14, 2016, is hereby incorporated by reference herein in its entirety as if fully set forth herein.

Application Ser. No. 15/155,005, entitled "PERSISTENT QUERY DISPATCH AND EXECUTION ARCHITECTURE" and filed in the United States Patent and Trademark Office on May 14, 2016, is hereby incorporated by reference herein in its entirety as if fully set forth herein.

Application Ser. No. 15/155,006, entitled "SINGLE INPUT GRAPHICAL USER INTERFACE CONTROL ELEMENT AND METHOD" and filed in the United States Patent and Trademark Office on May 14, 2016, is hereby incorporated by reference herein in its entirety as if fully set forth herein.

Application Ser. No. 15/155,007, entitled "GRAPHICAL USER INTERFACE DISPLAY EFFECTS FOR A COMPUTER DISPLAY SCREEN" and filed in the United States Patent and Trademark Office on May 14, 2016, is hereby incorporated by reference herein in its entirety as if fully set forth herein.

Application Ser. No. 15/155,009, entitled "COMPUTER ASSISTED COMPLETION OF HYPERLINK COMMAND SEGMENTS" and filed in the United States Patent and Trademark Office on May 14, 2016, is hereby incorporated by reference herein in its entirety as if fully set forth herein.

Application Ser. No. 15/155,010, entitled "HISTORICAL DATA REPLAY UTILIZING A COMPUTER SYSTEM" and filed in the United States Patent and Trademark Office on May 14, 2016, is hereby incorporated by reference herein in its entirety as if fully set forth herein.

Application Ser. No. 15/155,011, entitled "DATA STORE ACCESS PERMISSION SYSTEM WITH INTERLEAVED APPLICATION OF DEFERRED ACCESS CONTROL FILTERS" and filed in the United States Patent and Trademark Office on May 14, 2016, is hereby incorporated by reference herein in its entirety as if fully set forth herein.

Application Ser. No. 15/155,012, entitled "REMOTE DATA OBJECT PUBLISHING/SUBSCRIBING SYSTEM HAVING A MULTICAST KEY-VALUE PROTOCOL" and filed in the United States Patent and Trademark Office on May 14, 2016, is hereby incorporated by reference herein in its entirety as if fully set forth herein.

While the disclosed subject matter has been described in conjunction with a number of embodiments, it is evident that many alternatives, modifications and variations would be, or are, apparent to those of ordinary skill in the applicable arts. Accordingly, Applicants intend to embrace all such alternatives, modifications, equivalents and variations that are within the spirit and scope of the disclosed subject matter.

What is claimed is:

1. A memory-efficient and processor-efficient computer system for reliable implementation of a table data cache proxy, the system comprising:
 a plurality of data server computers each being programmed with a table data service accessible via an electronic messaging protocol;
 a table data cache proxy enabled (TDCP-enabled) server computer coupled to the one or more data server computers, the TDCP-enabled server computer having a plurality of TDCP clients, the TDCP-enabled server computer caching data from the plurality of data server computers and aggregating subscriptions of the TDCP clients to the plurality of data server computers;
 the TDCP-enabled server computer comprising:
  one or more hardware processors;
  a cache memory device having at least a portion being a shared memory portion; and
  a computer readable data storage device coupled to the one or more hardware processors, the computer readable data storage device having stored thereon software instructions that, when executed by the one or more hardware processors, cause the one or more hardware processors to perform operations including:
   receiving, from a first TDCP client of the plurality of TDCP clients, a first electronic message requesting table data;
   determining whether a shared memory cache stored in the shared memory portion of the cache memory device contains a cached copy of the requested table data;
   when the shared memory cache contains a cached copy of the requested table data, transmitting, to the first TDCP client, one or more second electronic messages comprising a reference indicating a location where the cached copy is stored in the shared memory portion of the cache memory device in response to the first electronic message, the data received from at least one of the plurality of data server computers and stored in the cache memory device being authoritative due to a data model of the plurality of data server computers;
   when the shared memory cache does not contain a cached copy of the requested table data:
    selecting one or more data server computers from the plurality of data server computers as one or more appropriate data server computers to provide the requested table data,
    transmitting one or more third electronic messages to the one or more appropriate data server computers requesting the requested table data,
    receiving one or more fourth electronic messages from the one or more appropriate data server computers in response to the third electronic messages,
    filtering the received fourth electronic messages and storing a result of the filtering in the shared memory portion of the cache memory device.

2. A memory-efficient and processor-efficient computer system for reliable implementation of a table data cache proxy, the system comprising:
 a table data cache proxy enabled (TDCP-enabled) server computer coupled to a plurality of data server computers, the plurality of data server computers each being programmed with a table data service accessible via an electronic messaging protocol, the TDCP-enabled server computer having a plurality of TDCP clients, the TDCP-enabled server computer caching data from the plurality of data server computers and aggregating subscriptions of the TDCP clients to the plurality of data server computers;

the TDCP-enabled server computer comprising:
one or more hardware processors;
a cache memory device having at least a portion being a shared memory portion; and
a computer readable data storage device coupled to the one or more hardware processors, the computer readable data storage device having stored thereon software instructions that, when executed by the one or more hardware processors, cause the one or more hardware processors to perform operations including:
receiving, from a first TDCP client of the plurality of TDCP clients, a first electronic message requesting table data;
determining whether a shared memory cache stored in the shared memory portion of the cache memory device contains a cached copy of the requested table data;
when the shared memory cache contains a cached copy of the requested table data, transmitting, to the first TDCP client, one or more second electronic messages comprising a reference indicating a location where the cached copy is stored in the shared memory portion of the cache memory device in response to the first electronic message, the data received from at least one of the plurality of data server computers and stored in the cache memory device being authoritative due to a data model of the plurality of data server computers;
when the shared memory cache does not contain a cached copy of the requested table data, requesting the requested data from a server of the plurality of data servers.

3. The system of claim 2, wherein the operations further include:
when the shared memory cache does not contain a cached copy of the requested table data, transmitting a request to subscribe for updates from the one or more appropriate data server computers;
receiving a subscription update from one or more of the plurality of data server computers; and
electronically distributing the received subscription update to one or more of the plurality of TDCP clients.

4. The system of claim 2,
wherein the first electronic message requests data from a data block and comprises a minimum response length; and
wherein, when additional data above the minimum response length is available within the block, the additional data is included in response to the first electronic message to prevent redundant subsequent requests.

5. The system of claim 2, wherein the first electronic message includes a table location discovery request requesting a list of table locations for a given table key, the table key uniquely identifying a table.

6. The system of claim 2, wherein the first electronic message is a table location metadata retrieval request requesting table-location-level metadata including the size of a table.

7. The system of claim 2, wherein the first electronic message is a column location metadata retrieval request requesting column-location-level metadata.

8. The system of claim 2, wherein column data is laid out in an optimized data layout to enable high performance data access, the column-location-level metadata including information indicating the optimized data layout.

9. The system of claim 2, wherein the first electronic message is a column file size retrieval request requesting the size of a column file.

10. The system of claim 2, wherein the first electronic message is a column file data retrieval request requesting at least a portion of a block of binary data from a column file.

11. The system of claim 2,
wherein the plurality of data server computers comprises at least two data server computers providing the same data; and
wherein the TDCP-enabled server is configured to reconnect to any of the data server computers, and upon reconnection any in-progress requests are re-sent and any subscriptions are renewed.

12. The system of claim 2, wherein the operations further include:
when the first electronic message requests a block of binary data, determining whether a future request for another block of binary data is likely based on a number of previously received requests; and
when the future request is determined to be likely, prefetching the another block of binary data including transmitting one or more sixth electronic messages to the one or more appropriate data servers requesting the another block of binary data.

13. The system of claim 2, the operations further including:
when the shared memory cache does not contain a cached copy of the requested table data:
selecting one or more data server computers from the plurality of data server computers as one or more appropriate data server computers to provide the requested table data,
the requesting including transmitting one or more third electronic messages to the one or more appropriate data server computers requesting the requested table data,
receiving one or more fourth electronic messages from the one or more appropriate data server computers in response to the third electronic messages,
filtering the received fourth electronic messages and storing a result of the filtering in the shared memory portion of the cache memory device, and
transmitting, to the first TDCP client computer, one or more fifth electronic messages comprising a reference indicating a location where the result of the filtering is stored in the shared memory portion of the cache memory device in response to the first electronic message.

14. A system comprising:
one or more hardware processors of a table data cache proxy enabled (TDCP-enabled) server, the TDCP-enabled server being coupled to one or more data servers;
a computer readable data storage device coupled to the one or more hardware processors, the computer readable data storage device having stored thereon software instructions that, when executed by the one or more hardware processors, cause the one or more hardware processors to perform operations including:
receiving a first electronic message requesting table data;
determining whether a cache of the TDCP-enabled server contains a cached copy of the requested table data;
when the cache of the TDCP-enabled server contains a cached copy of the requested table data, transmitting one or more second electronic messages providing the cached copy of the requested table data from the cache in response to the first electronic message, the data received from at least one of the one or more data servers and stored in the cache being authoritative due to a data model of the one or more data servers when the cache of the TDCP-enabled server does not contain a cached copy of the requested data, requesting the requested data from a server of the plurality of data servers.

15. The system of claim 14,
wherein the TDCP-enabled server further comprises a shared memory in which at least a portion of the cache is stored,
wherein the one or more second electronic messages comprise an indication where the cached copy is stored in the shared memory of the TDCP-enabled server, and
wherein the one or more fifth electronic messages comprise indications where the requested table data is stored in the shared memory of the TDCP-enabled server.

16. The system of claim 14, wherein the first electronic message is received via a network from a remote client, the one or more second electronic messages are transmitted to the remote client via the network, and the one or more fifth electronic messages are transmitted to the remote client via the network.

17. The system of claim 14, wherein the first electronic message is received via an inter process communication (IPC) mechanism from a client, the one or more second electronic messages are transmitted to the client via the IPC mechanism, and the one or more fifth electronic messages are transmitted to the client via the IPC mechanism.

18. The system of claim 14,
wherein the first electronic message requests data from a data block and comprises a minimum response length; and
wherein, when additional data above the minimum response length is available within the block, the additional data is included in response to the first electronic message to prevent redundant subsequent requests.

19. The system of claim 14, wherein the first electronic message is one of:
a table location discovery request requesting a list of table locations for a given table key, the table key uniquely identifying a table;
a table location metadata retrieval request requesting table-location-level metadata including the size of a table;
a column location metadata retrieval request requesting column-location-level metadata, wherein column data is laid out in an optimized data layout to enable high performance data access, the column-location-level metadata including information indicating the optimized data layout;
a column file size retrieval request requesting the size of a column file; and
a column file data retrieval request requesting at least a portion of a block of binary data from a column file.

20. The system of claim 14,
wherein the one or more data servers is a plurality of data servers comprising at least two data sources providing the same data; and
wherein the TDCP-enabled server is configured to reconnect to any of the data servers, and upon reconnection any in-progress requests are re-sent and any subscriptions are renewed.

21. The system of claim 14, wherein the operations further include:
when the first electronic message requests a block of binary data, determining whether a future request for another block of binary data is likely based on a number of received requests; and
when the future request is determined to be likely, prefetching the another block of binary data including transmitting one or more sixth electronic messages to the one or more appropriate data servers requesting the another block of binary data.

22. The system of claim 14, the operations further including:
when, based on the determining, the cache of the TDCP-enabled server does not contain a cached copy of the requested data:
determining one or more appropriate data servers of the one or more data servers to request the requested table data from,
the requesting including transmitting one or more third electronic messages to the one or more appropriate data servers requesting the requested table data,
receiving one or more fourth electronic messages from the one or more appropriate servers in response to the one or more third electronic messages, and
filtering the received one or more fourth electronic messages and, based on a result of the filtering, transmitting one or more fifth electronic messages providing the requested table data in response to the first electronic message.

23. A method comprising:
receiving, at a table data cache proxy enabled (TDCP-enabled) server, a first electronic message requesting table data, the TDCP-enabled server caching data;
determining that a cache of the TDCP-enabled server contains a cached copy of the requested table data;
after the determining that the cache of the TDCP-enabled server contains a cached copy of the requested table data, transmitting one or more second electronic messages providing the cached copy of the requested table data from the cache in response to the first electronic message, the data stored in the cache being authoritative due to a data model;
receiving, at the TDCP-enabled server, another electronic message requesting second table data;
determining that the cache of the TDCP-enabled server does not contain a cached copy of the requested second table data; and
after the determining that the cache of the TDCP-enabled server does not contain a cached copy of the requested second table data, requesting the requested second table data.

24. The method of claim 23,
wherein the one or more data servers comprises a plurality of data servers; and
wherein, when the first electronic message requests one or more data locations, the filtering comprises combining at least a portion of each of two or more of the one or more fourth electronic messages to create a composite of data from two or more of the plurality of data servers as the result of the filtering.

25. The method of claim 23, wherein the first electronic message is one of:
a table location discovery request requesting a list of table locations for a given table key, the table key uniquely identifying a table;

a table location metadata retrieval request requesting table-location-level metadata including the size of a table;

a column location metadata retrieval request requesting column-location-level metadata, wherein column data is laid out in an optimized data layout to enable high performance data access, the column-location-level metadata including information indicating the optimized data layout;

a column file size retrieval request requesting the size of a column file; and a column file data retrieval request requesting at least a portion of a block of binary data from a column file.

26. The method of claim 23, wherein the one or more data servers comprises a plurality of data servers comprising a first and second data server providing the same data; and wherein the TDCP-enabled server is configured to reconnect to any of the data servers, and upon reconnection any in-progress requests are re-sent and any subscriptions are renewed.

27. The method of claim 23, further comprising:

determining whether a future request for another block of binary data is likely based on a number of received requests; and when the future request is determined to be likely, prefetching the another block of binary data including transmitting one or more sixth electronic messages to the one or more appropriate data servers requesting the another block of binary data.

28. The method of claim 23, further comprising:

when the cache of the TDCP-enabled server does not contain a cached copy of the requested data, transmitting a request to subscribe for updates from the one or more appropriate data servers;

receiving a subscription update from one or more of the one or more data servers; and electronically distributing the received subscription update to one or more subscribers of the TDCP-enabled server.

29. The method of claim 23, further comprising:

after the determining that the cache of the TDCP-enabled server does not contain a cached copy of the requested second table data:

determining one or more appropriate data servers of the one or more data servers to request the requested second table data from, the requesting including transmitting one or more third electronic messages to the one or more appropriate data servers requesting the requested second table data, receiving one or more fourth electronic messages from the one or more appropriate servers in response to the one or more third electronic messages, and filtering the received one or more fourth electronic messages and, based on a result of the filtering, transmitting one or more fifth electronic messages providing the requested second table data in response to the another electronic message.

30. A nontransitory computer readable medium having stored thereon software instructions that, when executed by one or more processors, cause the one or more processors to perform operations including:

receiving, at a table data cache proxy enabled (TDCP-enabled) server, a first electronic message requesting table data, the TDCP-enabled server being coupled to one or more data servers having a table data service accessible via an electronic messaging protocol, the TDCP-enabled server caching data from the one or more data servers;

determining whether a cache of the TDCP-enabled server contains a cached copy of the requested table data;

when the cache of the TDCP-enabled server contains a cached copy of the requested table data, transmitting one or more second electronic messages providing the cached copy of the requested table data from the cache in response to the first electronic message, the data received from at least one of the one or more data servers and stored in the cache being authoritative due to a data model of the one or more data servers; and when the cache of the TDCP-enabled server does not contain a cached copy of the requested data, requesting the requested data from a server of the one or more of data servers.

31. The nontransitory computer readable medium of claim 30, wherein the one or more data servers comprises a plurality of data servers; and wherein, when the first electronic message requests one or more data locations, the filtering comprises combining at least a portion of each of two or more of the one or more fourth electronic messages to create a composite of data from two or more of the plurality of data servers as the result of the filtering.

32. The nontransitory computer readable medium of claim 30, wherein the first electronic message is one of:

a table location discovery request requesting a list of table locations for a given table key, the table key uniquely identifying a table;

a table location metadata retrieval request requesting table-location-level metadata including the size of a table;

a column location metadata retrieval request requesting column-location-level metadata, wherein column data is laid out in an optimized data layout to enable high performance data access, the column-location-level metadata including information indicating the optimized data layout;

a column file size retrieval request requesting the size of a column file; and a column file data retrieval request requesting at least a portion of a block of binary data from a column file.

33. The nontransitory computer readable medium of claim 30, wherein the one or more data servers comprises a plurality of data servers comprising a first and second data server providing the same data; and wherein the TDCP-enabled server is configured to reconnect to any of the data servers, and upon reconnection any in-progress requests are re-sent and any subscriptions are renewed.

34. The nontransitory computer readable medium of claim 30, the operations further comprising:

determining whether a future request for another block of binary data is likely based on a number of received requests; and when the future request is determined to be likely, prefetching the another block of binary data including transmitting one or more sixth electronic messages to the one or more appropriate data servers requesting the another block of binary data.

35. The nontransitory computer readable medium of claim 30, the operations further comprising:
when, based on the determining, the cache of the TDCP-enabled server does not contain a cached copy of the requested data:
determining one or more appropriate data servers of the one or more data servers to request the requested table data from,
transmitting one or more third electronic messages to the one or more appropriate data servers requesting the requested table data,
receiving one or more fourth electronic messages from the one or more appropriate servers in response to the one or more third electronic messages, and
filtering the received one or more fourth electronic messages and, based on a result of the filtering, transmitting one or more fifth electronic messages providing the requested table data in response to the first electronic message.

\* \* \* \* \*